US011957642B2

(12) United States Patent
Tsujiura et al.

(10) Patent No.: US 11,957,642 B2
(45) Date of Patent: Apr. 16, 2024

(54) INTERNAL SUBSTANCE SUPPLIER AND METHOD OF PRODUCING MOLDED PRODUCT

(71) Applicants: KIKUSUI SEISAKUSHO LTD., Kyoto (JP); Otsuka Pharmaceutical Co., Ltd., Tokyo (JP)

(72) Inventors: Yuji Tsujiura, Kyoto (JP); Tomohiro Kakitani, Kyoto (JP); Shohei Yamada, Osaka (JP); Akihiro Sawada, Osaka (JP); Shinshu Unida, Osaka (JP)

(73) Assignees: KIKUSUI SEISAKUSHO LTD., Kyoto (JP); OTSUKA PHARMACEUTICAL CO., LTD., Tokyo (JP)

( * ) Notice: Subject to any disclaimer, the term of this patent is extended or adjusted under 35 U.S.C. 154(b) by 0 days.

(21) Appl. No.: 17/726,529

(22) Filed: Apr. 22, 2022

(65) Prior Publication Data
US 2023/0338238 A1    Oct. 26, 2023

(51) Int. Cl.
B29C 43/34    (2006.01)
A61J 3/10    (2006.01)
B29C 43/00    (2006.01)

(52) U.S. Cl.
CPC .............. *A61J 3/10* (2013.01); *B29C 43/003* (2013.01); *B29C 43/34* (2013.01)

(58) Field of Classification Search
CPC .......... A61J 3/10; B29C 43/003; B29C 43/34; B30B 11/00
See application file for complete search history.

(56) References Cited

U.S. PATENT DOCUMENTS 9,610,225 B2 * 4/2017 Maeda ................... B30B 11/34
2018/0236760 A1 * 8/2018 Imai ........................ B41F 17/36

FOREIGN PATENT DOCUMENTS

JP    2015-229181 A    12/2015
JP    2015229181    * 12/2015    ............. B30B 11/08

OTHER PUBLICATIONS

Otsuka and Proteus Announce the First U.S. FDA approval of a Digital Medicine System: ABILIFY MYCITE® (aripiprazole tablets with sensor), (online), Otsuka Pharmaceutical Co., Ltd., (searched on Jul. 20, 2019)).

* cited by examiner

*Primary Examiner* — Arrie L Reuther
*Assistant Examiner* — Shibin Liang
(74) *Attorney, Agent, or Firm* — MCGINN I.P. LAW GROUP, PLLC

(57) ABSTRACT

An internal substance supplier includes a conveying mechanism including a conveying member configured to capture and convey an internal substance, and a supply mechanism including a scraping member disposed to cross a conveyance route of the substance by the conveying member in the conveying mechanism and configured to collide with the substance conveyed by the conveying member, a gliding member including a recessed groove configured to guide the substance colliding with the scraping member and scraped from the conveying member, to be adjacent to a position vertically above a die bore in a table in a compression-molding machine, and a push transfer member including a projection configured to come into contact with the substance, push the substance to a start edge of the recessed groove in the gliding member, and move along the recessed groove to transfer the substance to an end edge of the recessed groove.

15 Claims, 13 Drawing Sheets

INTERNAL SUBSTANCE SUPPLIER AND METHOD OF PRODUCING MOLDED PRODUCT

BACKGROUND

There has been known a rotary compression-molding machine including a table of a turret having die bores, and an upper punch and a lower punch slidably retained above and below each of the die bores, and configured to horizontally rotate the table and the punches together to compression mold (or tablet) a powdery material filled in the die bores when the paired upper and lower punches pass between an upper roll and a lower roll. The compression-molding machine of this type is applied to produce pharmaceutical tablets, food products, electronic components, and the like.

A molded product sometimes includes a buried internal substance. In particular, a recent molded product as a pharmaceutical product includes a buried IC chip having a tiny sensor in order to check whether or not a patient has taken the pharmaceutical product (see, for example, "Otsuka and Proteus Announce the First U.S. FDA Approval of a Digital Medicine System: ABILIFY MYCITE® (aripiprazole tablets with sensor)", (online), Otsuka Pharmaceutical Co., Ltd., (searched on Jul. 20, 2019)). The applicants of this patent application have earlier filed an application directed to a supplier configured to supply an internal substance to be buried in a molded product to a die bore in a table of a compression-molding machine (e.g., see JP 2015-229181 A).

SUMMARY OF THE INVENTION

The exemplary invention provides a supplier preferably configured to supply a compression-molding machine with an internal substance to be buried in a molded product.

The exemplary disclosure provides an internal substance supplier configured to supply an internal substance to be buried in a molded product into a die bore in a table of a compression-molding machine configured to fill the die bore with a powdery material and compress the powdery material by upper and lower punches to obtain the molded product, the internal substance supplier including: a conveying mechanism including a conveying member configured to capture and convey the internal substance; and a supply mechanism including a scraping member disposed to cross a conveyance route of the internal substance by the conveying member in the conveying mechanism and configured to collide with the internal substance conveyed by the conveying member, a gliding member having a recessed groove configured to guide the internal substance colliding with the scraping member and scraped from the conveying member, to be adjacent to a position vertically above the die bore in the table of the compression-molding machine, and a push transfer member having a projection configured to come into contact with the internal substance colliding with the scraping member, push the internal substance to a start edge of the recessed groove in the gliding member, and move along the recessed groove to transfer the internal substance to an end edge of the recessed groove. The internal substance supplier thus configured can appropriately supply the internal substance conveyed by the conveying mechanism to the die bore in the table of the compression-molding machine by the supply mechanism.

The conveying member in the conveying mechanism and the push transfer member in the supply mechanism serve as (i.e., include) rotatable rotators. When there are three rotatable rotators in total, such a minimally necessary configuration enables execution of a series of processing including receiving the internal substance to be buried in the molded product, conveying the internal substance, and supplying the internal substance into the die bore of the molding machine. The internal substance supplier does not need four or more rotators in total.

When the supply mechanism further includes a striking member supported by the push transfer member and configured to move along with the projection and hit from above the internal substance reaching the end edge of the recessed groove in the gliding member to drop the internal substance into the die bore in the table of the compression-molding machine, the internal substance can be reliably dropped into the die bore in the table of the molding machine even if the internal substance gliding or sliding along the recessed groove in the gliding member is electrostatically charged.

When the supply mechanism further includes a suction unit configured to suck to retain the internal substance until the internal substance colliding with the scraping member is pushed to the start edge of the recessed groove in the gliding member by the projection of the push transfer member, the internal substance scraped from the conveying member in the conveying mechanism can be reliably guided into the recessed groove in the gliding member.

When the supply mechanism further has an outlet opening positioned to confront the internal substance pushed to the start edge of the recessed groove in the gliding member and allowing air for static elimination of the internal substance to blow out, the internal substance can be inhibited from being electrostatically charged.

The internal substance may include an IC chip, particularly a chip used for communication between inside and outside a body of a person having the molded product in the body. The molded product may be a pharmaceutical product.

The exemplary disclosure provides a method of producing a molded product containing an internal substance and obtained by compression molding in a die bore in a table of a turret, the method including: conveying the internal substance by a carrier tape (or a tape carrier); ejecting the internal substance conveyed by the carrier tape, sucking the internal substance to a lower surface of a first rotator, and conveying the internal substance to a first position by the first rotator; delivering the internal substance at the first position from the first rotator to an upper surface of a second rotator, and sucking and conveying the internal substance to a second position by the second rotator; and pushing to transfer the internal substance on the upper surface of the second rotator at the second position in a direction different from a rotation direction of the second rotator by a push transfer member disposed at a third rotator, to convey the internal substance to a position of the die bore in the turret. According to this method, such a minimally necessary configuration enables execution of a series of processing including receiving the internal substance to be buried in the molded product, conveying the internal substance, and supplying the internal substance into the die bore of the molding machine. This method does not need four or more rotators in total.

The push transfer member transfers the internal substance from the upper surface of the second rotator to an upper surface of a gliding member disposed below the push transfer member, and causes the internal substance to glide on the gliding member.

The internal substance on the upper surface of the second rotator is scraped at the second position by a scraping member disposed above the second rotator.

The exemplary disclosure also provides a supplier configured to supply an internal substance to be buried in a molded product, to a die bore in a table of a compression-molding machine configured to fill the die bore with a powdery material and compress the powdery material to obtain the molded product, the internal substance supplier including: a first rotator configured to eject the internal substance conveyed by a carrier tape, suck the internal substance to a lower surface of the first rotator, and convey the internal substance to a first position; a second rotator configured to receive the internal substance from the first rotator at the first position, suck the internal substance to an upper surface of the second rotator, and convey the internal substance to a second position; and a push transfer member disposed at a third rotator and configured to push to transfer the internal substance on the upper surface of the second rotator at the second position in a direction different from a rotation direction of the second rotator. The internal substance supplier having such a minimally necessary configuration enables execution of a series of processing including receiving the internal substance to be buried in the molded product, conveying the internal substance, and supplying the internal substance into the die bore of the molding machine.

The internal substance supplier may further include a gliding member disposed below the push transfer member and serving as a gliding surface for the internal substance pushed to be transferred from the upper surface of the second rotator.

The internal substance supplier may further include a scraping member disposed above the second rotator and configured to scrape the internal substance on the upper surface of the second rotator at the second position.

The exemplary disclosure also provides an internal substance supplier configured to supply an internal substance to be buried in a molded product into a die bore in a table of a compression-molding machine configured to fill the die bore with a powdery material and compress the powdery material to obtain the molded product, the internal substance supplier including: a conveying mechanism including a conveying member configured to capture and convey the internal substance; and a supply mechanism including a scraping member disposed to cross a conveyance route of the internal substance conveyed by the conveying member in the conveying mechanism and configured to collide with the internal substance conveyed by the conveying member, and a push transfer member having a projection configured to come into contact with the internal substance colliding with the scraping member to transfer the internal substance. The internal substance supplier thus configured can appropriately supply the internal substance conveyed by the conveying mechanism to the die bore in the table of the compression-molding machine by the supply mechanism.

The conveying member and the push transfer member rotate in synchronization with each other.

A powdery material may be an aggregate of minute solids and conceptually includes an aggregate of particles such as so-called "granules" and an aggregate of powder smaller than such particles. Examples of the powdery material include a powdery material containing a principal agent (i.e., a main ingredient or an active ingredient), an excipient appropriately increasing volume and weight of a molded product, a lubricant preventing the powdery material from adhering to a die bore or a punch, a binder binding particles of the powdery material, starch serving as a disintegrant absorbing moisture to enable easy disintegration of the molded product, and an additive exemplified by a stabilizer stabilizing quality like crystalline cellulose or a carbonate, or a preservative prolonging shelf life. The powdery material according to the exemplary disclosure also includes a mixture of two or more types of powdery materials, and a mixture of a powdery principal agent and a powdery additive.

The exemplary invention achieves a supplier preferably configured to supply a compression-molding machine with an internal substance to be buried in a molded product.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF AN EXEMPLARY EMBODIMENT

An exemplary embodiment of the invention will now be described with reference to the drawings. Initially described is an overview of an entire rotary compression-molding machine A (hereinafter, referred to as the "molding machine A") according to the exemplary embodiment. The molding machine A includes an upper punch 5 and a lower punch 6 vertically slidably retained above and below a vertically penetrating die bore 4, and is configured to compress powdery materials M1 and M2 filled in the die bore 4 by the upper punch 5 and the lower punch 6 to obtain a molded product P such as a pharmaceutical tablet. The die bore 4 and the upper and lower punches 5 and 6 constitute a mold for the molded product P.

Figure 1:
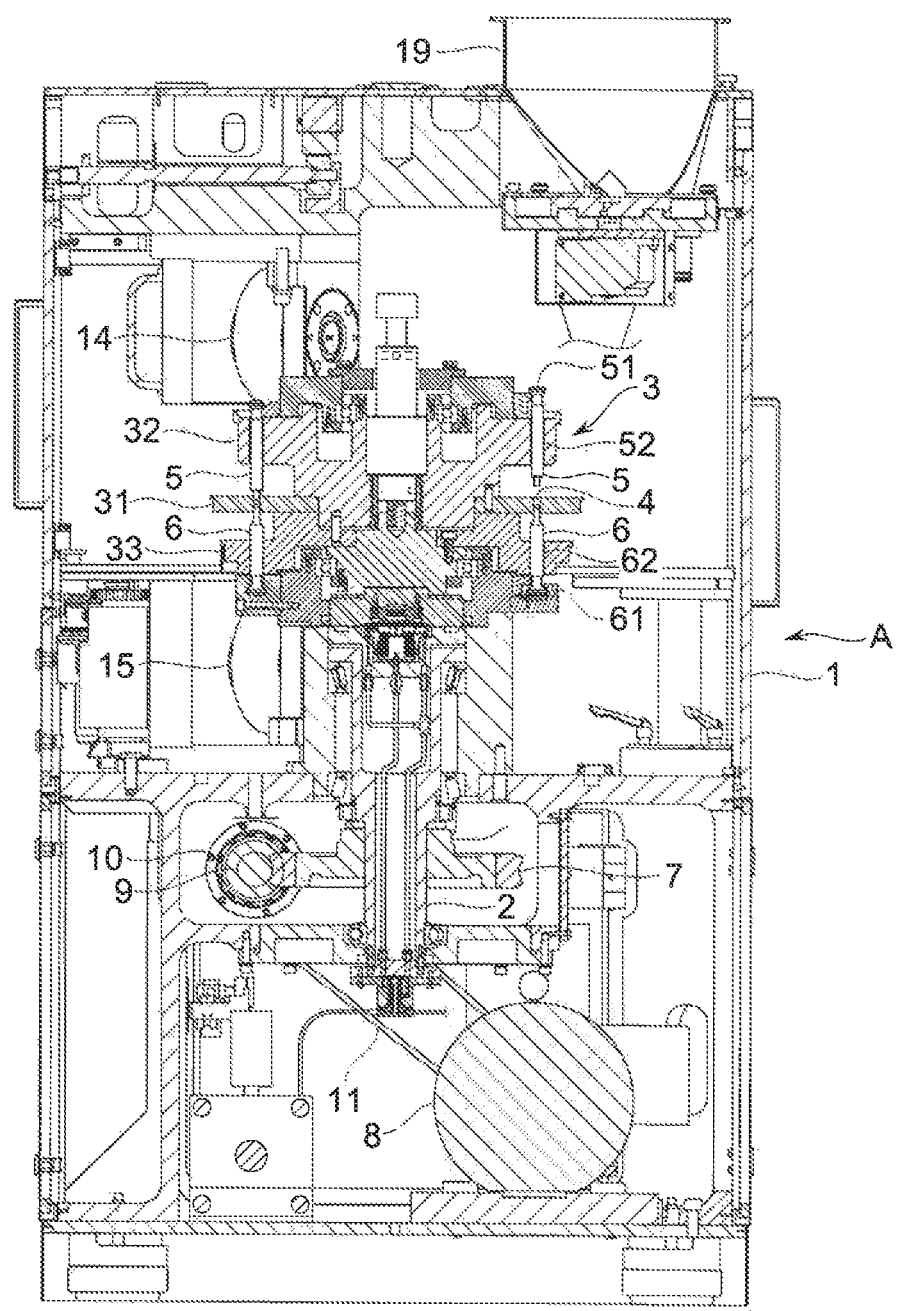
FIG. 1 is a longitudinal sectional view of a rotary compression-molding machine according to an exemplary embodiment of the exemplary invention.

As shown exemplarily in FIG. 1, the molding machine A includes a frame 1 accommodating an upright shaft 2 serving as a rotary shaft, and a turret 3 fixed to an upper portion of the upright shaft 2. The turret 3 horizontally rotates about the upright shaft 2, and more specifically, spins about the upright shaft 2. The turret 3 has a rotation direction indicated by an arrow in FIG. 2. The turret 3 includes a table (e.g., die disc) 31, an upper punch retaining portion 32, and a lower punch retaining portion 33. As shown exemplarily in FIG. 2, the table 31 has a substantially circular disc shape in a planar view along a rotary axis of the turret 3, in other words, in the vertical direction. The table 31 has a plurality of die bores 4 disposed in an outer circumferential portion so as to be aligned in the rotation direction or a circumferential direction at predetermined intervals. Each of the die bores 4 vertically penetrates the table 31. The table 31 is alternatively divided into a plurality of plates. Instead of forming the die bores 4 by directly drilling the table 31, the table 31 may alternatively have a plurality of die members that is separate from the table 31 and is detachably attached thereto. In this case, each of the die members alternatively has a die bore 4 penetrating vertically.

The die bores 4 each have the upper punch 5 and the lower punch 6 disposed above and below the die bore 4, respectively. The upper punches 5 and the lower punches 6 are retained by the upper punch retaining portion 32 and the lower punch retaining portion 33 so as to be independently slidable vertically with respect to a corresponding one of the die bores 4. The upper punches 5 each have a tip 53 that enters and exits a corresponding one of the die bores 4. The lower punches 6 each have a tip 63 that is kept inserted to a corresponding one of the die bores 4. The upper punches 5 and the lower punches 6 horizontally rotate, and more specifically revolve, about the upright shaft 2 along with the turret 3 and the die bores 4.

The upright shaft 2 has a lower end to which a worm wheel 7 is attached. The worm wheel 7 meshes with a worm gear 10. The worm gear 10 is fixed to a gear shaft 9 that is driven by a motor 8. Drive power outputted from the motor 8 is transmitted to the gear shaft 9 via a belt 11, so as to drive to rotate the upright shaft 2 by way of the worm gear 10 and the worm wheel 7, and further to rotate the turret 3 and the punches 5 and 6.

The powdery materials M1 and M2, as raw materials or constituent materials for the molded product P, are filled in the die bores 4 by feeders X1 and X2 each serving as a filling device. As to the feeders X1 and X2, there are several types which may be used, including an agitated feeder and a gravity feeder. Each of the feeders X1 and X2 may be of any type in the exemplary invention. The powdery materials M1 and M2 are fed to the feeders X1 and X2 by a hopper 19.

Figure 2:
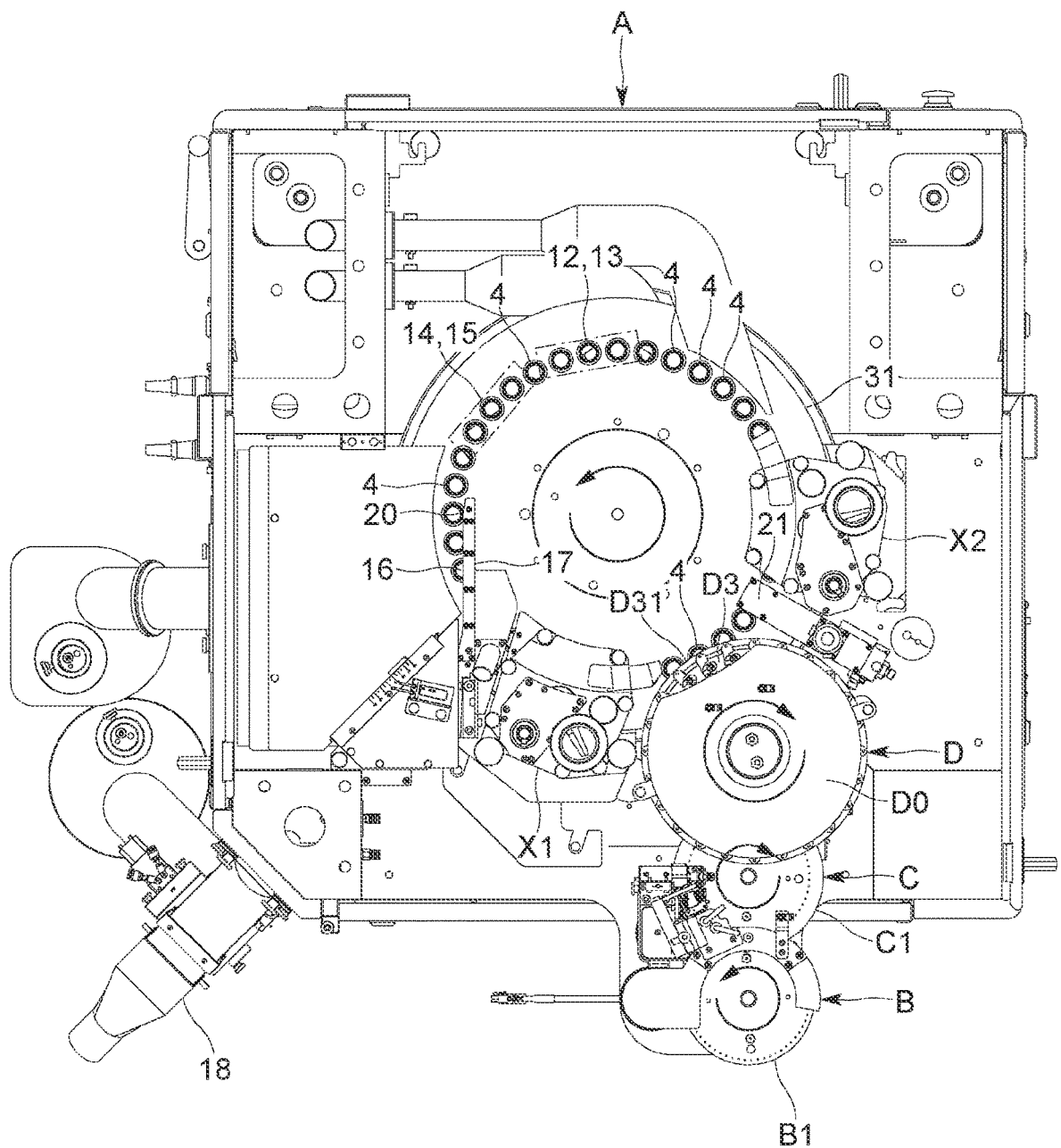
FIG. 2 is a plan view of the compression-molding machine and an internal substance supplier according to the exemplary embodiment.
Figure 3:
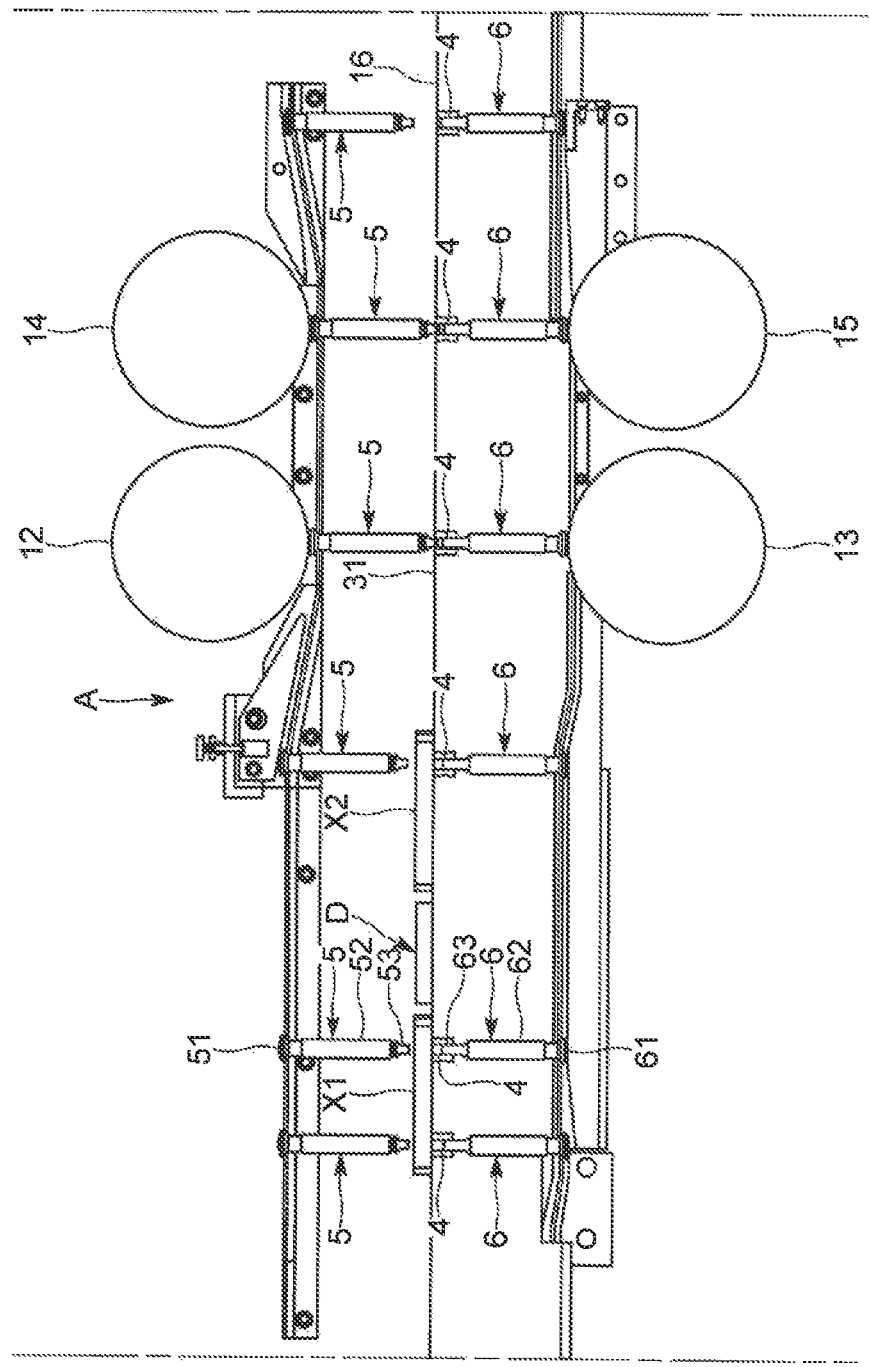
FIG. 3 is a cylindrical view of the compression-molding machine according to the exemplary embodiment.

As shown exemplarily in FIGS. 2 and 3, a preliminary compression upper roll 12, a preliminary compression lower roll 13, a substantial compression upper roll 14, and a substantial compression lower roll 15 are disposed on orbits of the punches 5 and 6 that revolve about the upright shaft 2. The preliminary compression upper roll 12 and the preliminary compression lower roll 13 are paired to vertically sandwich the punches 5 and 6, and the substantial compression upper roll 14 and the substantial compression lower roll 15 are paired to vertically sandwich the punches 5 and 6. The preliminary compression upper roll 12 and the preliminary compression lower roll 13 as well as the substantial compression upper roll 14 and the substantial compression lower roll 15 bias the upper and lower punches 5 and 6 to bring the upper and lower punches 5 and 6 closer to each other, so that end surfaces of the tips 53 and 63 compress from above and below the powdery materials M1 and M2 filled in the die bores 4.

The upper and lower punches 5 and 6 have heads 51 and 61 pressed by the rolls 12, 13, 14, and 15, and trunks 52 and 62 smaller in diameter than the heads 51 and 61. The upper punch retaining portion 32 of the turret 3 vertically slidably retains the trunks 52 of the upper punches 5, whereas the lower punch retaining portion 33 vertically slidably retains the trunks 62 of the lower punches 6. The tips 53 and 63 as distal ends of the trunks 52 and 62 are thinner than the remaining parts and each have a diameter substantially equal to an inner diameter of the die bores 4 so as to be inserted to the die bores 4. The punches 5 and 6 revolve to cause the rolls 12, 13, 14, and 15 to come closer to the heads 51 and 61 of the punches 5 and 6. The rolls 12, 13, 14, and 15 come into contact with the heads 51 and 61 to step thereonto. The rolls 12, 13, 14, and 15 further press the upper punches 5 downward and press the lower punches 6 upward. While the rolls 12, 13, 14, and 15 are in contact with flat surfaces of the punches 5 and 6, the punches 5 and 6 keep applying constant pressure to the powdery materials M1 and M2 in the die bore 4.

There is a collecting position 16 for the completed molded products P, at a position ahead, in the rotation direction of the turret 3 and the punches 5 and 6, of a portion pressed by the substantial compression upper roll 14 and the substantial compression lower roll 15. There is disposed a guide member 17 at the collecting position 16.

Figure 4A:
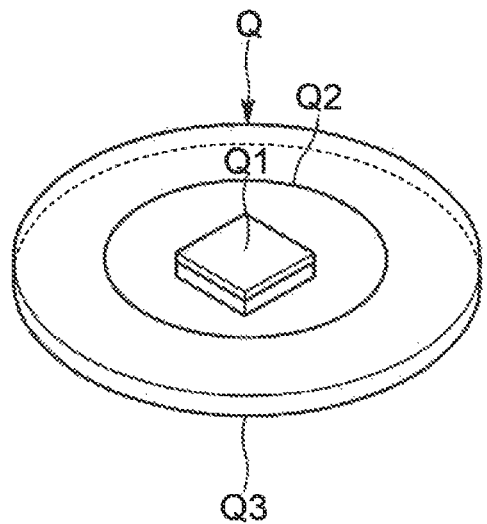
FIG. 4A is a perspective view of an internal substance buried in a molded product according to the exemplary embodiment.
Figure 4B:
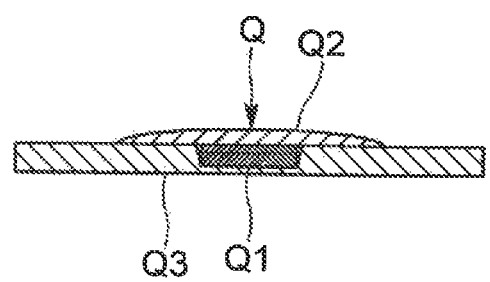
FIG. 4B is a longitudinal sectional view of the internal substance buried in the molded product according to the exemplary embodiment.

The molding machine A according to the exemplary embodiment is applied to produce a molded product P containing an internal substance Q. The internal substance Q includes a chip Q1 used for communication between inside and outside a body of a person having taken the molded product P as a pharmaceutical product. FIGS. 4A and 4B exemplarily show the internal substance Q. The internal substance Q includes the IC chip Q1 sandwiched between and wrapped in upper and lower films Q2 and Q3 like cellulose films, and is tiny enough to be harmless to a human body. The film Q2 overlapping from above the film Q3 is not limited to a thin film but may be liquid applied or dripped and then solidified. The internal substance Q according to the exemplary embodiment is small in vertical thickness. When the pharmaceutical product P reaches a stomach and a sensor mounted on the chip Q1 comes into contact with gastric juice, the chip Q1 transmits a signal. When the signal is received by a detector disposed outside the body of the person having taken the pharmaceutical product, the detector collects the fact that the person has taken the pharmaceutical product P and information such as when the pharmaceutical product P was taken.

Figure 5:
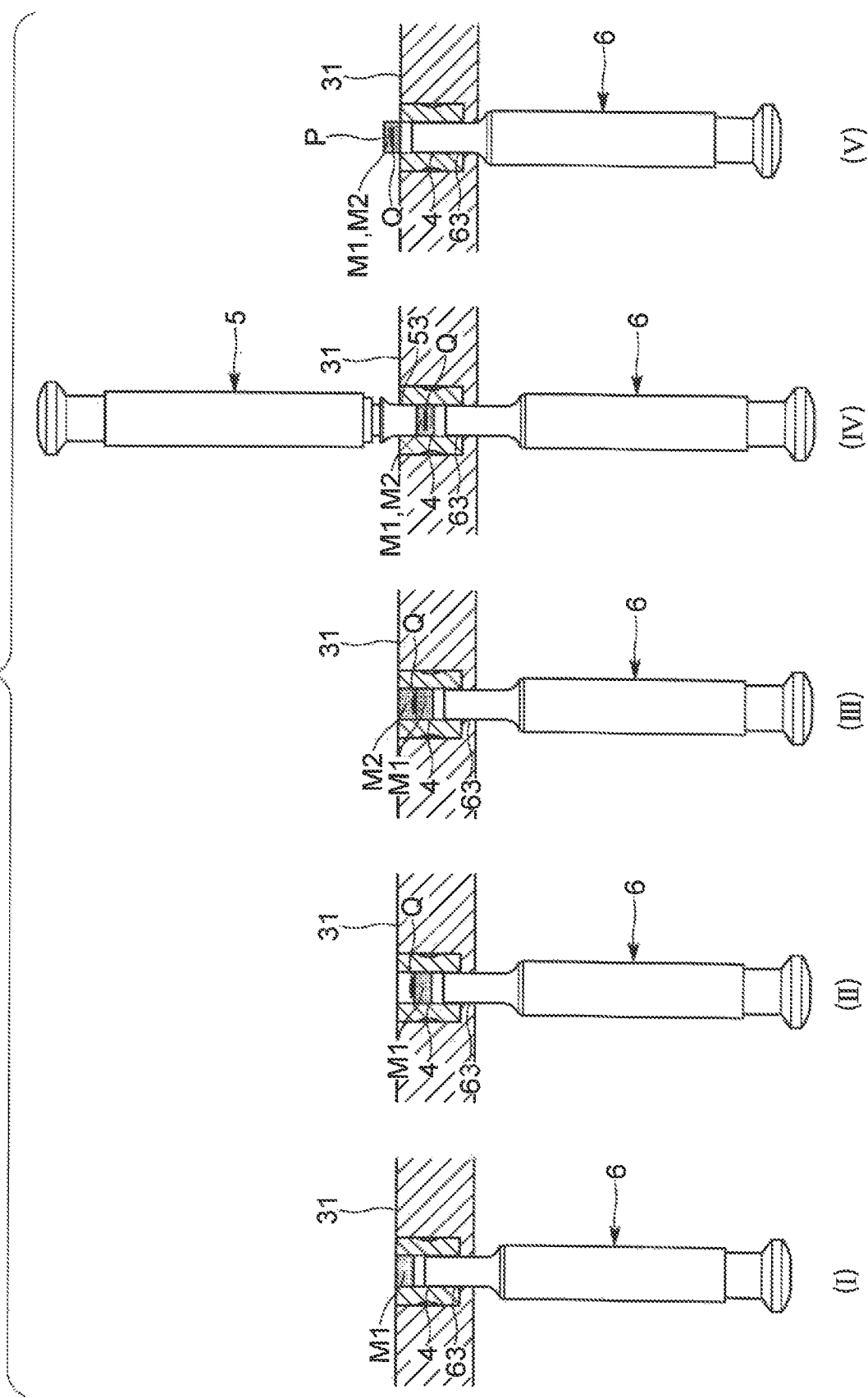
FIG. 5 shows explanatory views (I to V) on a process of producing the molded product by the compression-molding machine according to the exemplary embodiment.

As shown exemplarily in FIG. 5, a process of producing the molded product P will be described roughly. When the die bore 4, into which the tip 63 of the lower punch 6 is inserted, passes vertically below the first feeder X1 along with rotation of the turret 3, the first feeder X1 fills the die bore 4 with the powdery material M1 (I). The powdery material M1 filled in this case occupies part of a quantity necessary for the molded product P. Before the powdery material M1 is filled, a spray device (not shown) may spray to apply a lubricant or a spraying agent onto an inner peripheral surface of the die bore 4 into which the tip 63 of the lower punch 6 is inserted, an upper end surface of the tip 63 of the lower punch 6, and a lower end surface of the tip 53 of the upper punch 5. In the die bore 4 filled with the powdery material M1, the lower punch 6 temporarily ascends to level a powdery material overflowing the die bore 4. After the powdery material M1 in the die bore 4 reaches appropriate quantity, the lower punch 6 descends again.

When the die bore 4 subsequently passes vertically below a supply mechanism D in an internal substance supplier B, C, or D, the supply mechanism D supplies the die bore 4 with the internal substance Q (II).

When the die bore 4 passes vertically below the second feeder X2, the second feeder X2 fills the die bore 4 with the powdery material M2 (III). The filled powdery material M2 thus filled in this case occupies part of the quantity necessary for the molded product P. The powdery material M1 and the powdery material M2 have a total quantity equal to the quantity necessary for the molded product P. In the die bore 4 filled with the powdery material M2, the lower punch 6 ascends to level the powdery material overflowing the die bore 4 such that the powdery materials M1 and M2 in the die bore 4 have an appropriate quantity.

The upper punch 5 then descends, and the preliminary compression upper roll 12 and the preliminary compression lower roll 13 press the head 51 of the upper punch 5 and the head 61 of the lower punch 6 such that the tips 53 and 63 of the punches 5 and 6, respectively, preliminarily compress the powdery materials M1 and M2 in the die bore 4. The substantial compression upper roll 14 and the substantial compression lower roll 15 subsequently execute substantial compression including pressing the head 51 of the upper punch 5 and the head 61 of the lower punch 6 such that the tips 53 and 63 of the punches 5 and 6, respectively, substantially compress the powdery materials M1 and M2 in the die bore 4 (IV).

The lower punch 6 eventually ascends until the upper end surface of the tip 63 of the lower punch 6 substantially reaches the level of an upper end of the die bore 4, i.e., an upper surface of the table 31, and pushes a molded product P out of the die bore 4 onto the table 31 (V). The molded product P ejected from the die bore 4 is brought into contact with the guide member 17 due to rotation of the turret 3, and is shifted along the guide member 17 toward a molded product chute 18.

The internal substance supplier B, C, or D configured to supply each of the die bores 4 in the table 31 of the molding machine A with the internal substance Q will be described in detail below. As shown exemplarily in FIGS. 2 and 6, the internal substance supplier B, C, or D according to the exemplary embodiment includes conveying mechanisms B and C configured to capture the internal substance Q and convey, and the supply mechanism D configured to receive the internal substance Q from the conveying mechanisms B and C, guide the internal substance Q to a position vertically above the table 31 in the molding machine A, and drop the internal substance Q into the die bore 4. The internal substance supplier B, C, or D preferably enables execution of a series of processing including picking up the thin internal substance Q, conveying the internal substance Q to the table 31 of the molding machine A, and then dropping the internal substance Q into the die bore 4.

Figure 4C:
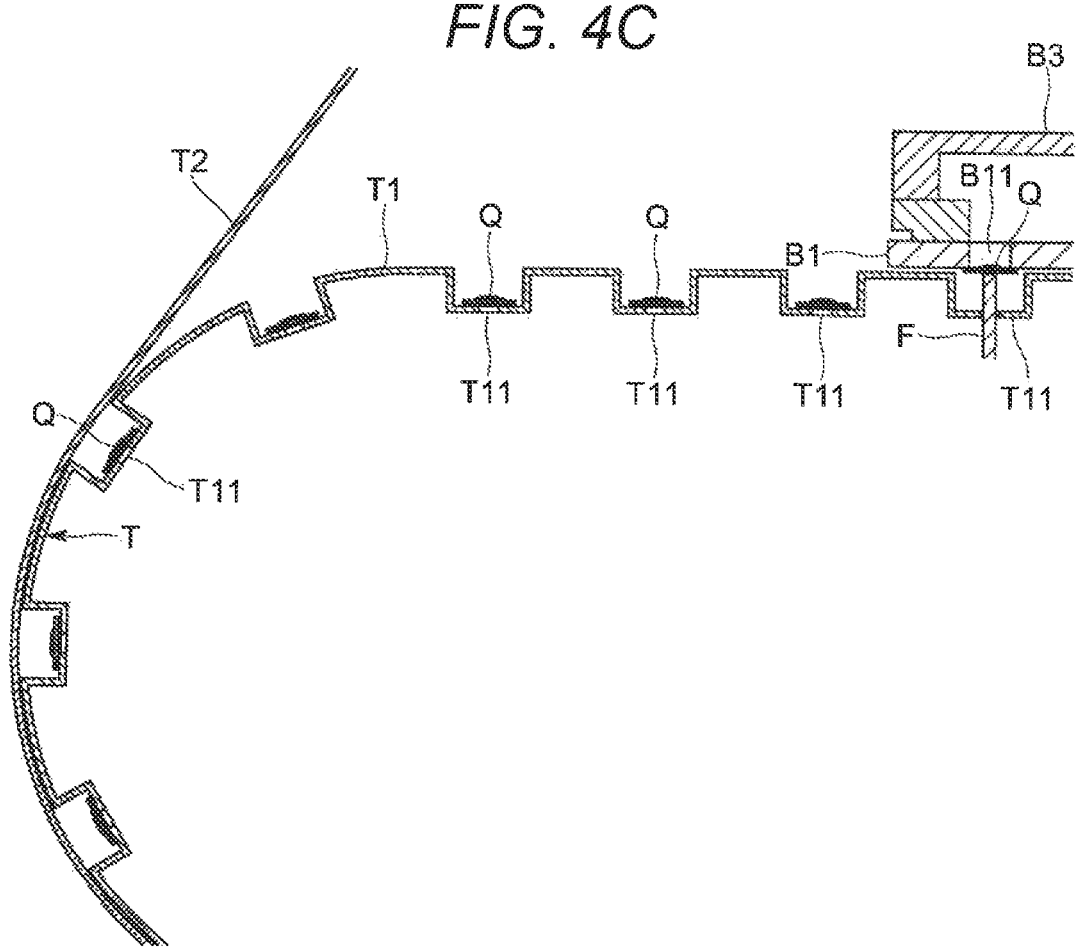
FIG. 4C is a longitudinal sectional view of the internal substance and a carrier tape accommodating the internal substance.

The conveying mechanisms B and C include a plurality of conveying mechanisms. The first conveying mechanism B positioned upstream is configured to sequentially eject the internal substances Q accommodated in pockets T11 in a carrier tape T for conveyance of the internal substances Q as shown exemplarily in FIG. 4C, and transfer the internal substances Q toward the second conveying mechanism C positioned downstream. As shown exemplarily in FIGS. 6 and 7, the first conveying mechanism B includes a first rotator B1 serving as a conveying member configured to suck to capture the internal substances Q one-by-one in suction bores B11 and convey the internal substances Q, a shaft B2 configured to drive to rotate the rotator B1, and a duct B3 configured to feed each of the suction bores B11 in the rotator B1 with negative pressure necessary for suction of the internal substance Q.

The rotator B1 is fixed to an upper portion of the shaft B2, and horizontally rotates, and more specifically spins, about the shaft B2 integrally with the shaft B2. The rotator B1 has a rotation direction indicated by an arrow in FIG. 2. The rotator B1 has a substantially circular disc shape in a planar view along a rotary axis, in other words, in the vertical direction. The rotator B1 has the plurality of suction bores B11 disposed in an outer circumferential portion so as to be aligned in the rotation direction or a circumferential direction at predetermined intervals. Each of the suction bores B11 vertically penetrates the rotator B1.

The rotator B1 rotates whereas the duct B3 stays still without rotating. The duct B3 has a cylindrical body expanded to have a partial arc shape along the outer circumferential portion of the rotator B1 in a planar view at least from an ejecting position B4 for the internal substances Q by the first conveying mechanism B to a delivery position C4 also called "a first position," to the second conveying mechanism C. The duct B3 has an internal space sucked by a pump (not shown) to have negative pressure. The rotator B1 in the first conveying mechanism B has a lower surface retaining the sucked internal substance Q. The duct B3 is accordingly disposed above the rotator B1, is opened downward, and is located adjacent to an upper surface of the rotator B1 such that its opening is positioned vertically above the suction bore B11.

The emboss carrier tape T is drawn out of a reel by a tape feeder (not shown) and is delivered to the ejecting position B4 for the internal substances Q in the first conveying mechanism B. In its course, as shown exemplarily schematically in FIG. 4C, a cover tape (e.g., top tape) T2 serving as a cover is separated from a bottom tape T1 having the pockets T11, and the pockets T11 accommodating the internal substances Q are opened upward. The bottom tape T1 is inserted vertically below the outer circumferential portion of the rotator B1 at the ejecting position B4 for the internal substances Q. When one of the opened pockets T11 and one of the suction bores B11 in the rotator B1 are overlapped with each other in a planar view and the suction bore B11 supplied with negative pressure from the duct B3 sucks the internal substance Q upward from below, the internal substance Q is ejected from the pocket T11 and is engaged with a lower open edge of the suction bore B11. At this timing, a mechanism included in the tape feeder may optionally insert a pin F into the pocket T11 from below to push the internal substance Q upward.

Subsequently, along with rotation of the rotator B1, the internal substances Q sucked to the suction bores B11 shift from the ejecting position B4 to the delivery position C4. The internal substances Q having reached the delivery position C4 are delivered from the first conveying mechanism B to the second conveying mechanism C as described later.

The second conveying mechanism C is configured to sequentially receive the internal substances Q captured in the suction bores B11 in the rotator B1 of the first conveying mechanism B from the suction bores B11, and transfer the internal substances Q toward the supply mechanism D positioned downstream. As shown exemplarily in FIGS. 6 to 9, the second conveying mechanism C includes a rotator C1 serving as a conveying member configured to suck to capture the internal substances Q one-by-one in suction bores C11 and convey the internal substances Q, a shaft C2 configured to drive to rotate the rotator C1, and a duct C3 configured to feed each of the suction bores C11 in the rotator C1 with negative pressure necessary for suction of the internal substance Q.

The rotator C1 is fixed to an upper portion of the shaft C2, and horizontally rotates, and more specifically spins, about the shaft C2 integrally with the shaft C2. The rotator C1 has a rotation direction indicated by an arrow in FIG. 2. The rotator C1 is opposite in rotation direction to the rotator B1. The rotator C1 also has a substantially circular disc shape in a planar view along a rotary axis, in other words, in the vertical direction. The rotator C1 has the plurality of suction bores C11 disposed in an outer circumferential portion so as to be aligned in the rotation direction or a circumferential direction at predetermined intervals. Each of the suction bores C11 vertically penetrates the rotator C1. The outer circumferential portion of the rotator C1 is partially overlapped in a planar view with the outer circumferential portion of the rotator B1 in the first conveying mechanism B at the delivery position C4. The outer circumferential portion of the rotator C1 has an upper surface adjacent to a lower surface of the outer circumferential portion of the rotator B1 in the first conveying mechanism B.

The rotator C1 rotates whereas the duct C3 stays still without rotating. The duct C3 has a cylindrical body expanded to have a partial arc shape along the outer circumferential portion of the rotator C1 in a planar view at least from the first position, namely, the delivery position C4 where the second conveying mechanism C receives the internal substances Q, to a second position, namely, a scraping position D9 where the second conveying mechanism C releases the internal substances Q to be supplied to the supply mechanism D. The duct C3 has an internal space sucked by a pump (not shown) to have negative pressure. The rotator C1 in the second conveying mechanism C has an upper surface retaining the sucked internal substance Q. The duct C3 is accordingly disposed below the rotator C1, is opened upward, and is located adjacent to a lower surface of the rotator C1 such that its opening is positioned vertically below the suction bore C11.

Figure 7:
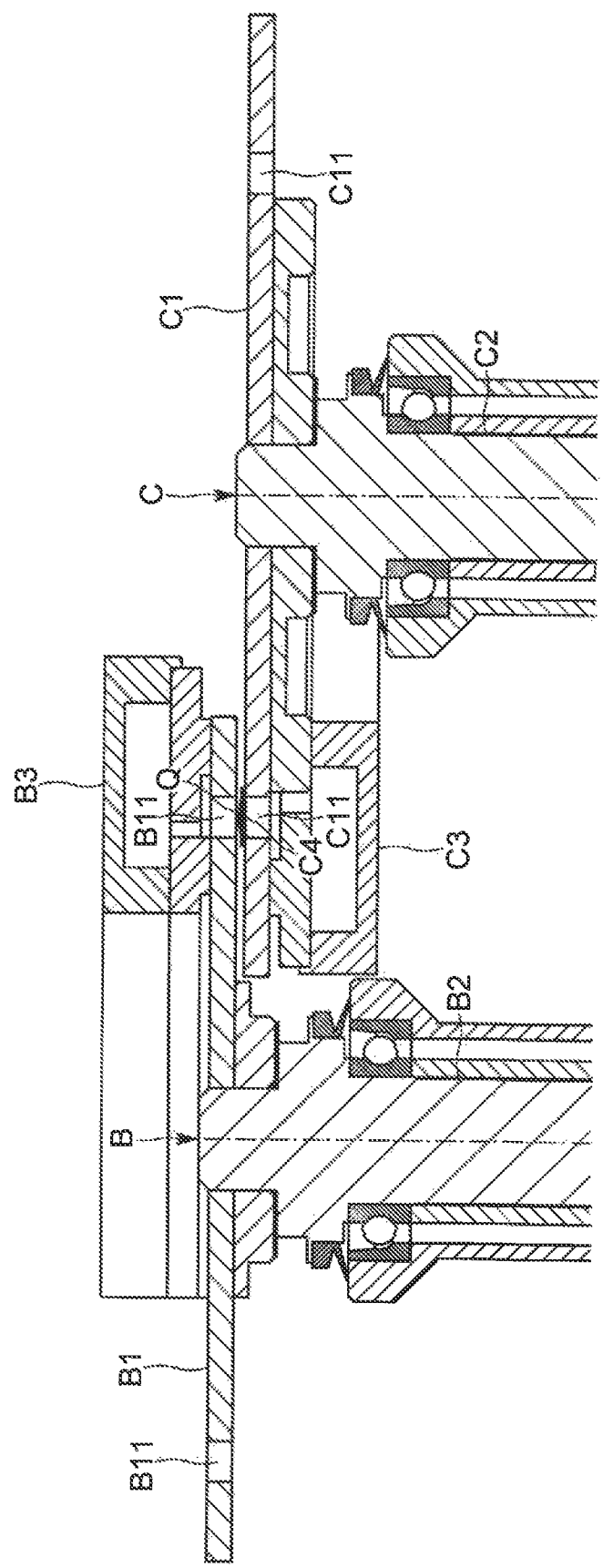
FIG. 7 is a longitudinal sectional view of conveying mechanisms in the internal substance supplier according to the exemplary embodiment.

As shown exemplarily in FIG. 7, the suction bore B11 in the rotator B1 of the first supply mechanism B and the internal substance Q captured in the suction bore B11 reach a position vertically above the outer circumferential portion of the rotator C1 at the delivery position C4. When one of the suction bores B11 in the rotator B1 of the first conveying mechanism B and one of the suction bores C11 in the rotator C1 of the second conveying mechanism C are overlapped with each other in a planar view and the suction bore C11 supplied with negative pressure from the duct C3 sucks the internal substance Q downward from above, the internal substance Q dropped out of the suction bore B11 is received to be engaged with an upper open edge of the suction bore C11.

Subsequently, along with rotation of the rotator C1, the internal substances Q sucked to the suction bores C11 shift from the delivery position C4 to the scraping position D9. The internal substances Q having reached the scraping position D9 are released from the rotator C1 in the second conveying mechanism C and are supplied to the supply mechanism D as described later.

When the internal substances Q are delivered from the rotator B1 of the first conveying mechanism B to the rotator C1 of the second conveying mechanism C at the delivery position C4, it can rarely happen that the internal substances Q are sucked to the suction bores C11 but have center positions largely displaced from centers of the suction bores C11.

Each of the internal substances Q can be conveyed in such a state onto the table 31 of the molding machine A by the supply mechanism D to be fed into the die bore 4. Alternatively, the internal substance Q sucked to each of the suction bores C11 may be optically measured in terms of its relative position to the suction bore C11 with use of a camera or the like, and the internal substance Q having the center position largely displaced from the center of the suction bore C11 may be removed halfway without being conveyed to the scraping position D9 of the supply mechanism D.

Figure 6:
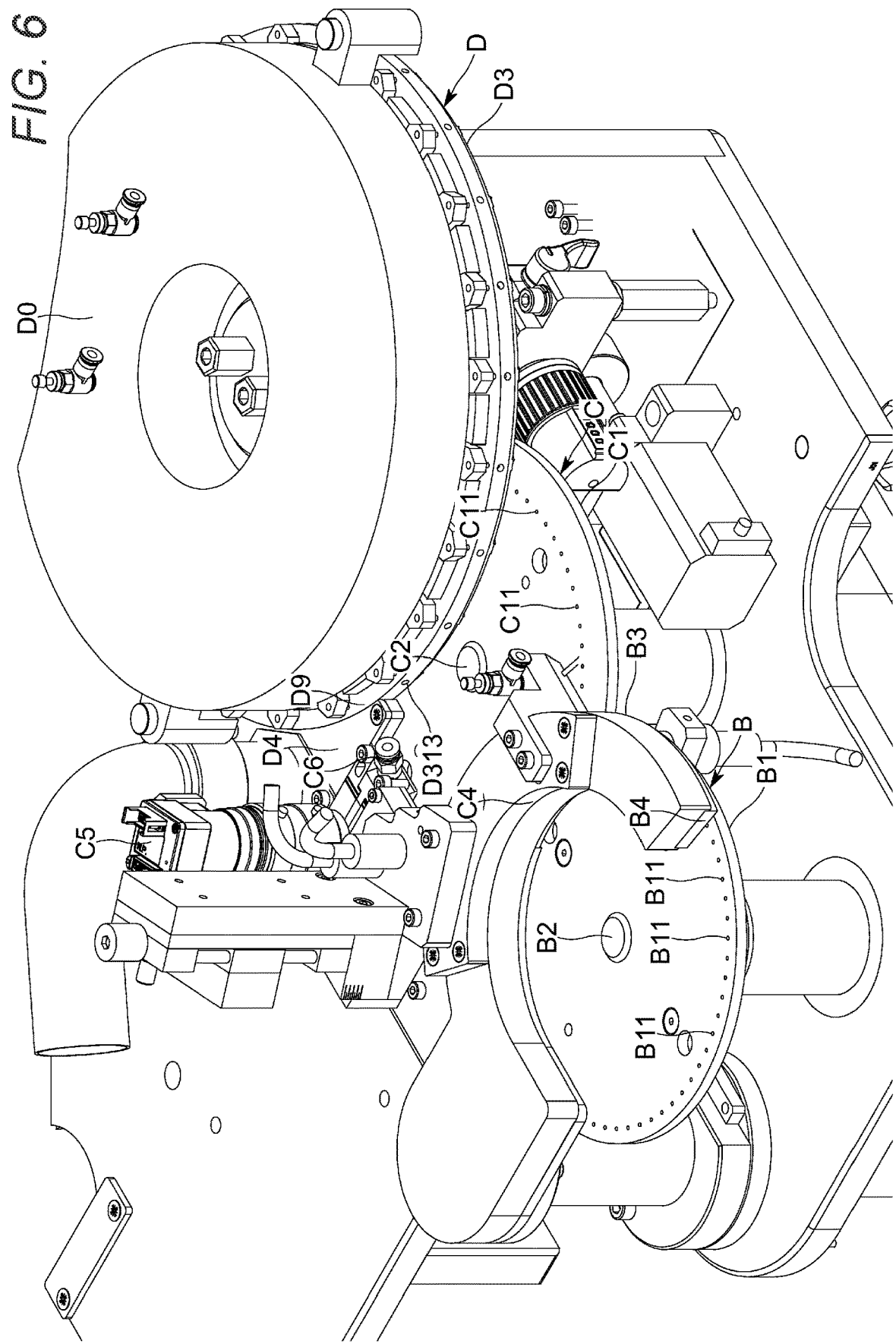
FIG. 6 is a perspective view of the internal substance supplier according to the exemplary embodiment.

In such a case of halfway removing the internal substance Q largely displaced from the suction bore C11, as shown exemplarily in FIG. 6, at a position on a horizontal rotation locus of the internal substance Q along with rotation of the rotator C1 and the suction bore C11, there is installed an optical measurement device C5 such as a camera configured to capture the suction bore C11 passing vertically therebelow and the internal substance Q sucked thereto. There is also installed a nozzle C6 configured to allow compressed air to be applied to the internal substance Q largely displaced from the suction bore C11 to detach the internal substance Q from the suction bore C11 and blow laterally outward from the rotator C1 for removal.

When the internal substance Q is removed from the suction bore C11, the die bore 4 of the molding machine A corresponding to the suction bore C11 is not fed with any internal substance Q, and the molded product P compression-molded in the die bore 4 does not contain any internal substance Q. The molded product P is defective and needs to be distinguished and removed from normal molded products each containing the internal substance Q. In view of this, as shown exemplarily in FIG. 2, at a position on a horizontal rotation locus of the powdery material M1 and the internal substance Q along with rotation of the table 31 and the die bore 4, there is installed an optical measurement device 21 such as a camera configured to capture the die bore 4 passing vertically therebelow and the internal substance Q expected to be fed in the die bore 4. There is also installed a nozzle 20 configured to allow compressed air to be applied to the molded product P molded in the die bore 4 not fed with any internal substance Q to blow the molded product P laterally outward from the table 31.

The measurement devices C5 (e.g., see FIG. 6) and 21 (e.g., see FIG. 2) and the removal nozzles C6 (e.g., see FIG. 6) and 20 (e.g., see FIG. 2) are not essential constituent elements of the internal substance supplier B, C, or D or the molding machine A according to the exemplary embodiment.

The supply mechanism D is configured to sequentially scrape the internal substances Q captured in the suction bores C11 in the rotator C1 of the second conveying mechanism C from the suction bores C11, transfer the internal substances Q toward the molding machine A positioned downstream, and eventually drop the internal substances Q into the die bores 4 in the table 31 one-by-one. As shown exemplarily in FIGS. 6 and 8 to 13, the supply mechanism D includes a scraping member D1 configured to scrape the internal substance Q conveyed by the rotator C1 in the second conveying mechanism C, a gliding member D2 having a recessed groove D21 guiding the internal substance Q scraped from the rotator C1, a supply disc D3 configured to push the internal substance Q scraped from the rotator C1 to a start edge D211 of the recessed groove D21 in the gliding member D2, push to transfer the internal substance Q along the recessed groove D21, and strike the internal substance Q into the die bore 4 in the table 31 of the molding machine A at an end edge D212 of the recessed groove D21, a suction unit D4 configured to assist the supply disc D3 in pushing the internal substance Q to the start edge D211 of the recessed groove D21, an outlet opening D5 allowing air to blow out for static elimination of the internal substance Q, a rail D6 and a lifting belt D7 causing the supply disc D3 to strike the internal substance Q into the die bore 4 in the table 31.

The scraping member D1 serves as a scraper configured to scrape the internal substance Q sucked to the suction bore C11 in the rotator C1 of the second conveying mechanism C to release the internal substance Q from the rotator C1 at the scraping position D9. The scraping member D1 is accordingly fixed to be positioned to block a horizontal rotation locus of the internal substances Q along with rotation of the rotator C1 and the suction bores C11. The scraping member D1 has a side surface D11 facing the scraping position D9 and crossing or being perpendicular to the horizontal rotation locus of the internal substances Q to be scraped. The internal substances Q collide with the side surface D11 to be scraped. The side surface D11 is substantially flush with an inner circumferential side surface of the recessed groove D21 in the gliding member D2. In other words, the side surface D11 is an upright partial cylindrical surface having a partial arc shape in a planar view along a rotary axis of the supply disc D3 or in the vertical direction and having an axis and a diameter substantially equal to those of the inner circumferential side surface of the recessed groove D21.

The gliding member D2 has an outer circumferential portion including the recessed groove D21 that extends to have a partial arc shape in a planar view, and is firmly fixed to a base D8 to stay still. The recessed groove D21 has the inner circumferential side surface and an outer circumferential side surface facing each other to shield a laterally inner end and a laterally outer end, and a bottom surface closing a lower end, to be opened only upward. As already described, the inner circumferential side surface of the recessed groove D21 is the upright partial cylindrical surface having the axis and the diameter substantially equal to those of the side surface D11 of the scraping member D1. The outer circumferential side surface of the recessed groove D21 is an upright partial cylindrical surface having an axis substantially equal to that of the inner circumferential side surface and a diameter lager than that of the inner circumferential side surface. The recessed groove D21 has a width, which is a distance between the inner circumferential side surface and the outer circumferential side surface, substantially constant from the start edge D211 to the end edge D212. The start edge D211 of the recessed groove D21 is slightly displaced downstream from the scraping position D9. The end edge D212 of the recessed groove D21 is overlapped in a planar view with an outer circumferential portion of the table 31 and the die bores 4 in the molding machine A. The gliding member D2 and the bottom surface of the recessed groove D21 are positioned above the upper surface of the table 31.

The supply disc D3 mainly includes a third rotator D31 serving as a push transfer member having projections D311 each configured to contact and push to transfer the internal substance Q scraped from the suction bore C11 in the rotator C1, a shaft D32 configured to drive to rotate the rotator D31, and striking members D33 supported on an upper surface of the rotator D31 and each configured to hit from above the internal substance Q to drop the internal substance Q into the die bore 4 in the table 31 of the molding machine A.

The rotator D31 is fixed to an upper portion of the shaft D32, and horizontally rotates, and more specifically spins, about the shaft D32 integrally with the shaft D32. The rotator D31 and the supply disc D3 have an identical rotation direction indicated by an arrow in FIG. 2. The supply disc D3 and the rotator D31 are equal in rotation direction to the rotator C1 but are opposite in rotation direction to the turret 3 and the table 31 in the molding machine A. The rotator D31 has a substantially circular disc shape in a planar view along a rotary axis, in other words, in the vertical direction. The rotator D31 and the shaft D32 have an identical axis substantially equal to the axis of the side surface D11 of the scraping member D1 having the partial cylindrical surface, and the axis of the side surfaces of the recessed groove D21 in the gliding member D2. As shown exemplarily in FIGS. 8, 10, 12, and 13, the plurality of projections D311 is disposed at predetermined intervals in the rotation direction or a circumferential direction on a lower surface of an outer circumferential edge portion of the rotator D31.

There are further pin holes D312 that are equal in the number to the projections D311 and are located adjacent to the projections D311 in the rotation direction of the rotator D31. The pin holes D312 vertically penetrate the outer circumferential edge portion of the rotator D31. The pin holes D312 each have a lower open edge positioned above lower surfaces of the projections D311. Conversely, the projections D311 project downward from lower edges of the pin holes D312 and have end surfaces D3111 facing the pin holes D312. The projections D311 and the pin holes D312 are inserted from above into the recessed groove D21 in the gliding member D2 and move along the recessed groove D21 in the recessed groove D21.

There are further communicating bores D313 drilled inward from an outer circumferential side surface of the rotator D31. The communicating bores D313 are equal in the number to the pin holes D312 and are opened to the outer circumferential side surface of the rotator D31, to allow communication from interiors of the pin holes D312 to outside the rotator D31.

Figure 8:
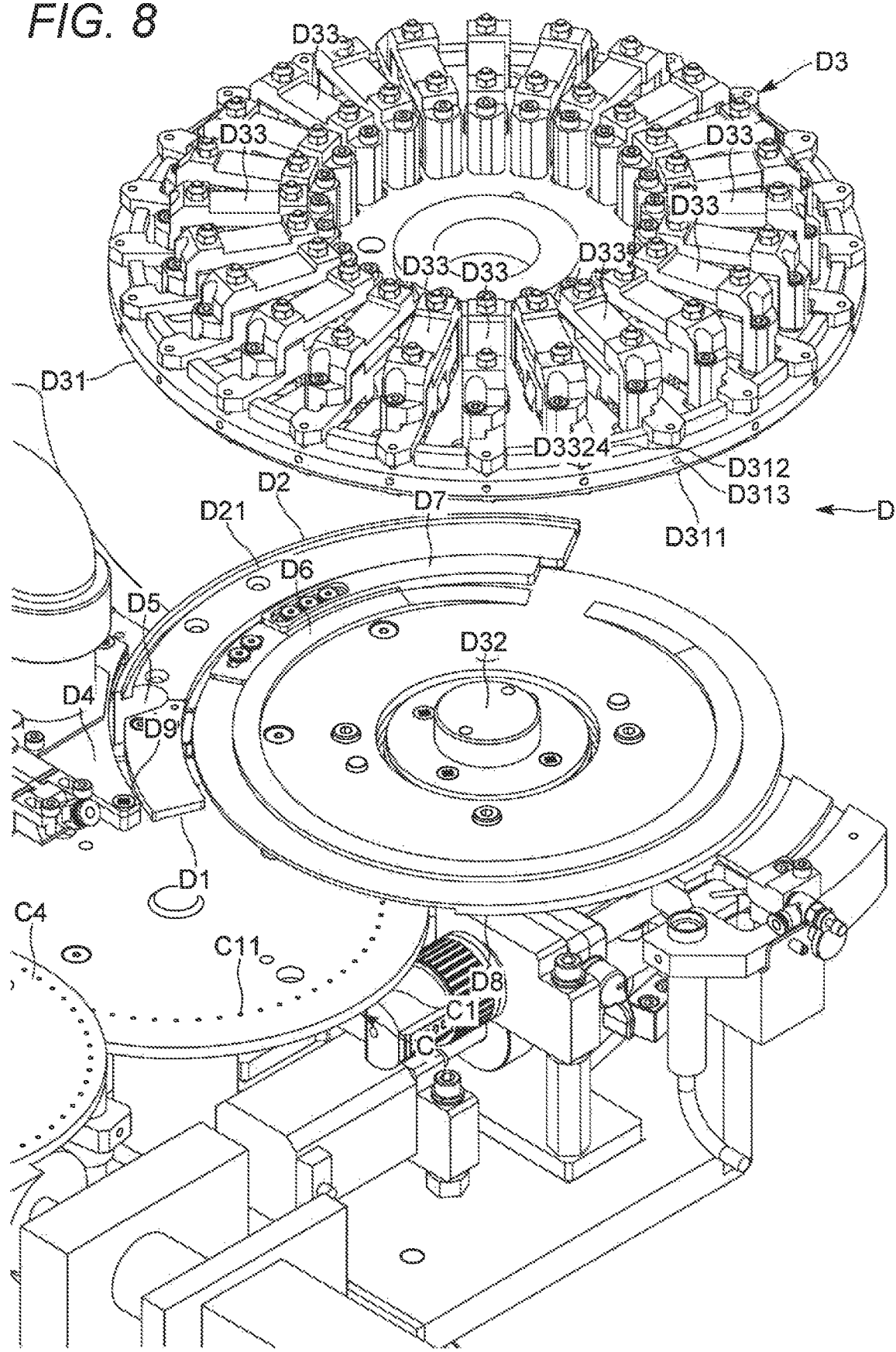
FIG. 8 is an exploded perspective view of a supply mechanism in the internal substance supplier according to the exemplary embodiment.
Figure 10:
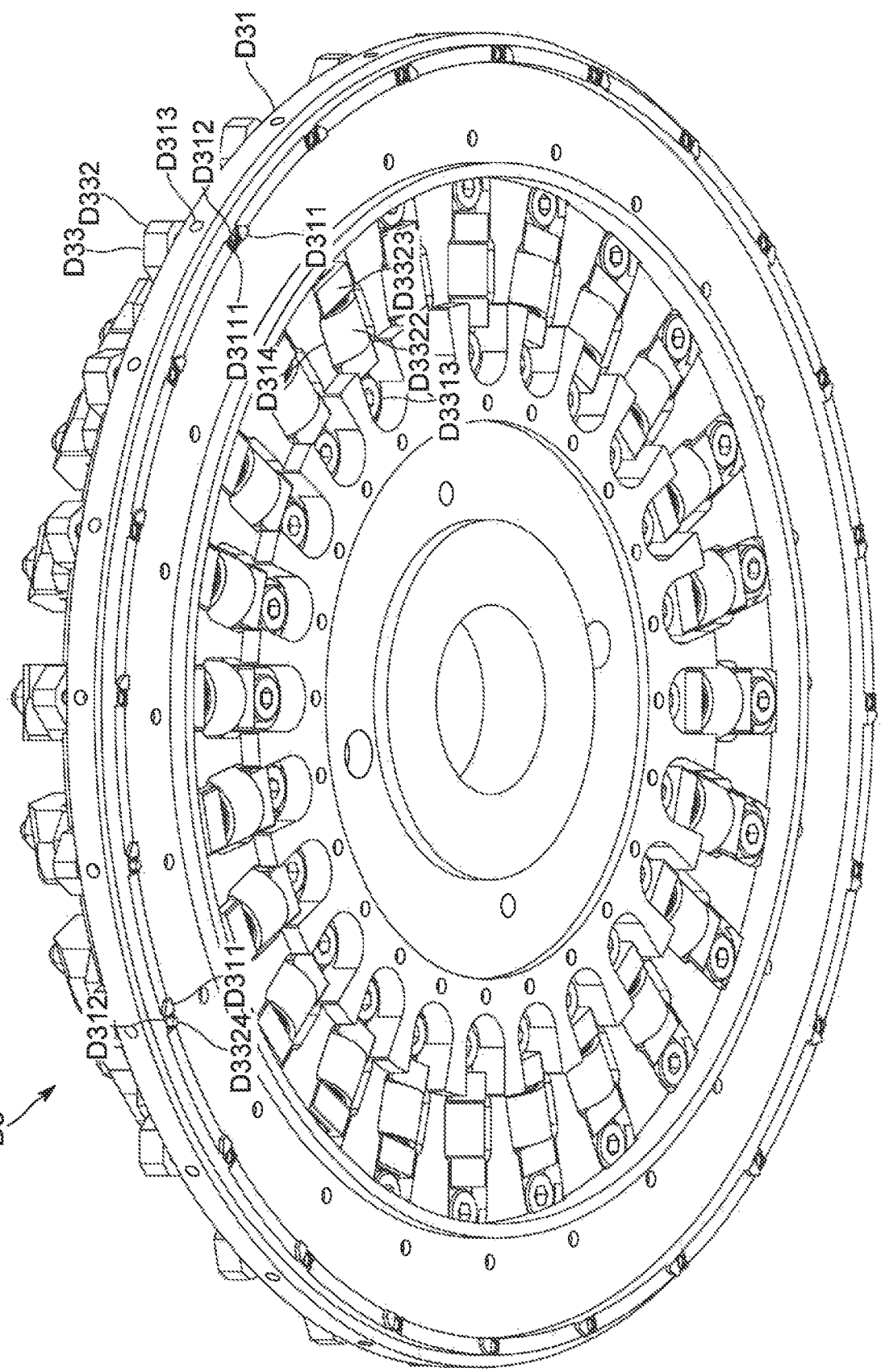
FIG. 10 is a perspective view from below, of a supply disc including a push transfer member and striking members in the supply mechanism of the internal substance supplier according to the exemplary embodiment.

The striking members D33 each have an outer appearance expanded in width in a radial direction perpendicular to the rotary axis of the rotator D31, are equal in the number to the pin holes D312, and are aligned radially in a planar view on the rotator D31, as shown exemplarily in FIGS. 8 and 10. One of the striking members D33 is paired with one set of the projection D311 and the pin hole D312. Along with horizontal rotation of the rotator D31, each of the striking members D33 obviously turns horizontally about the shaft D32.

Figure 11:
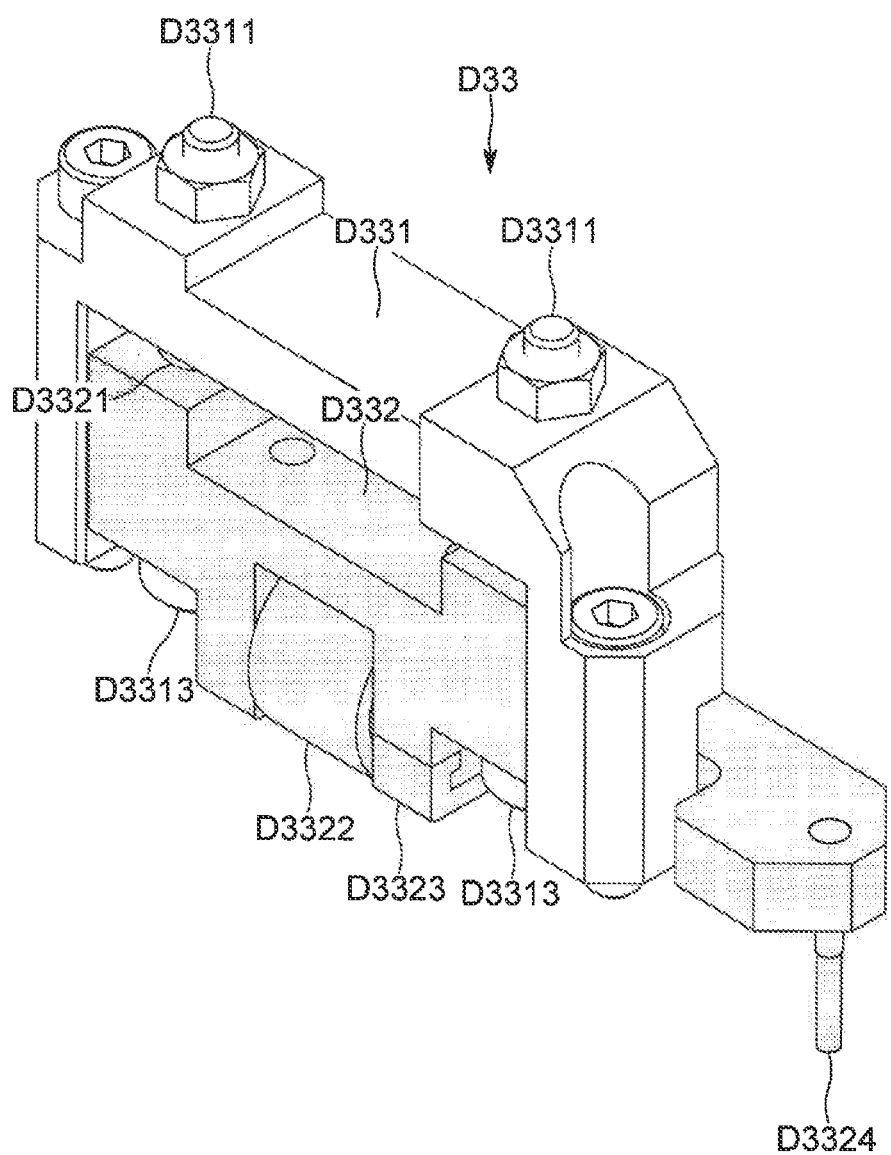
FIG. 11 is a perspective view of the single striking member in the supply mechanism of the internal substance supplier according to the exemplary embodiment.
Figure 12:
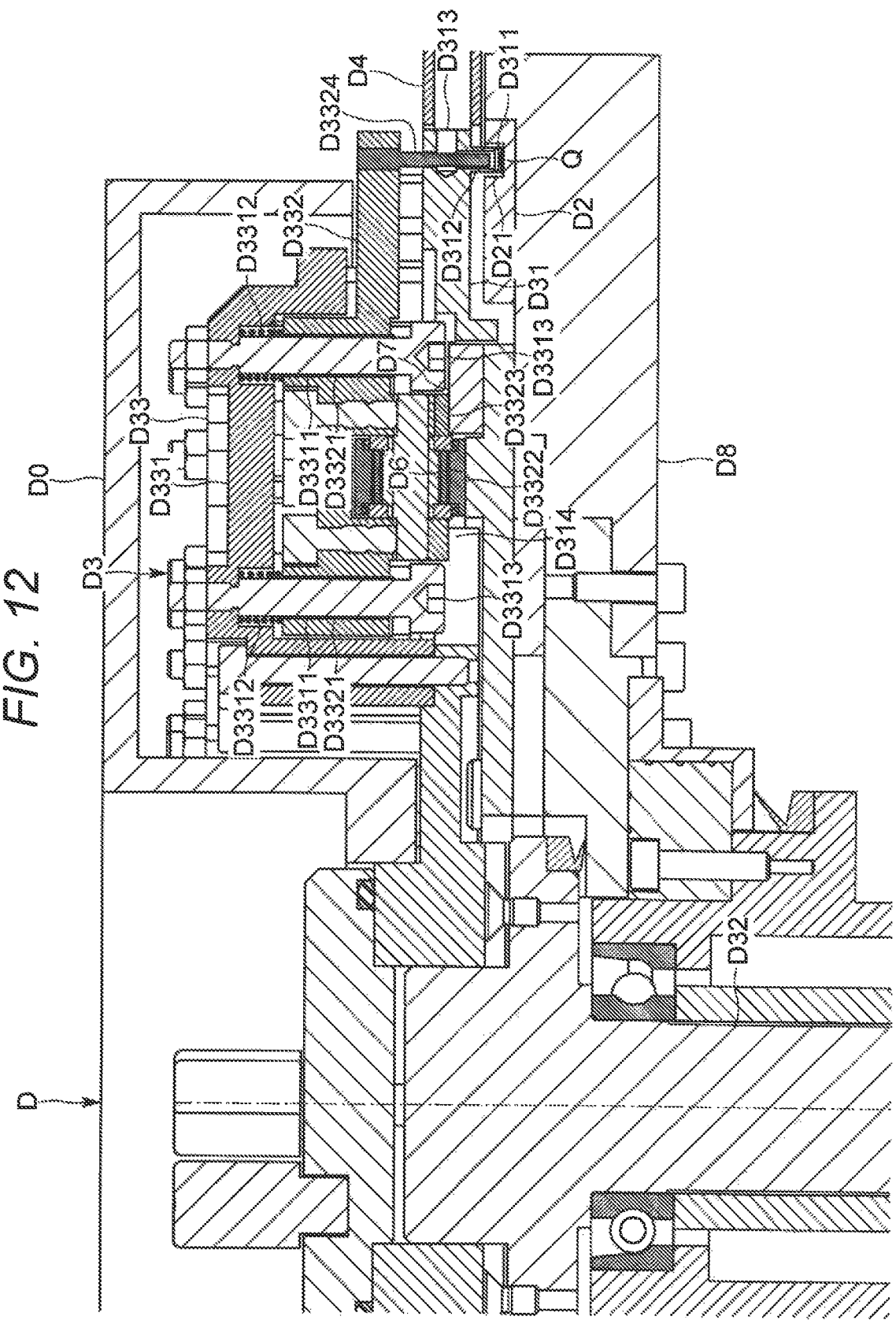
FIG. 12 is a longitudinal sectional view of the supply mechanism in the internal substance supplier according to the exemplary embodiment.
Figure 13:
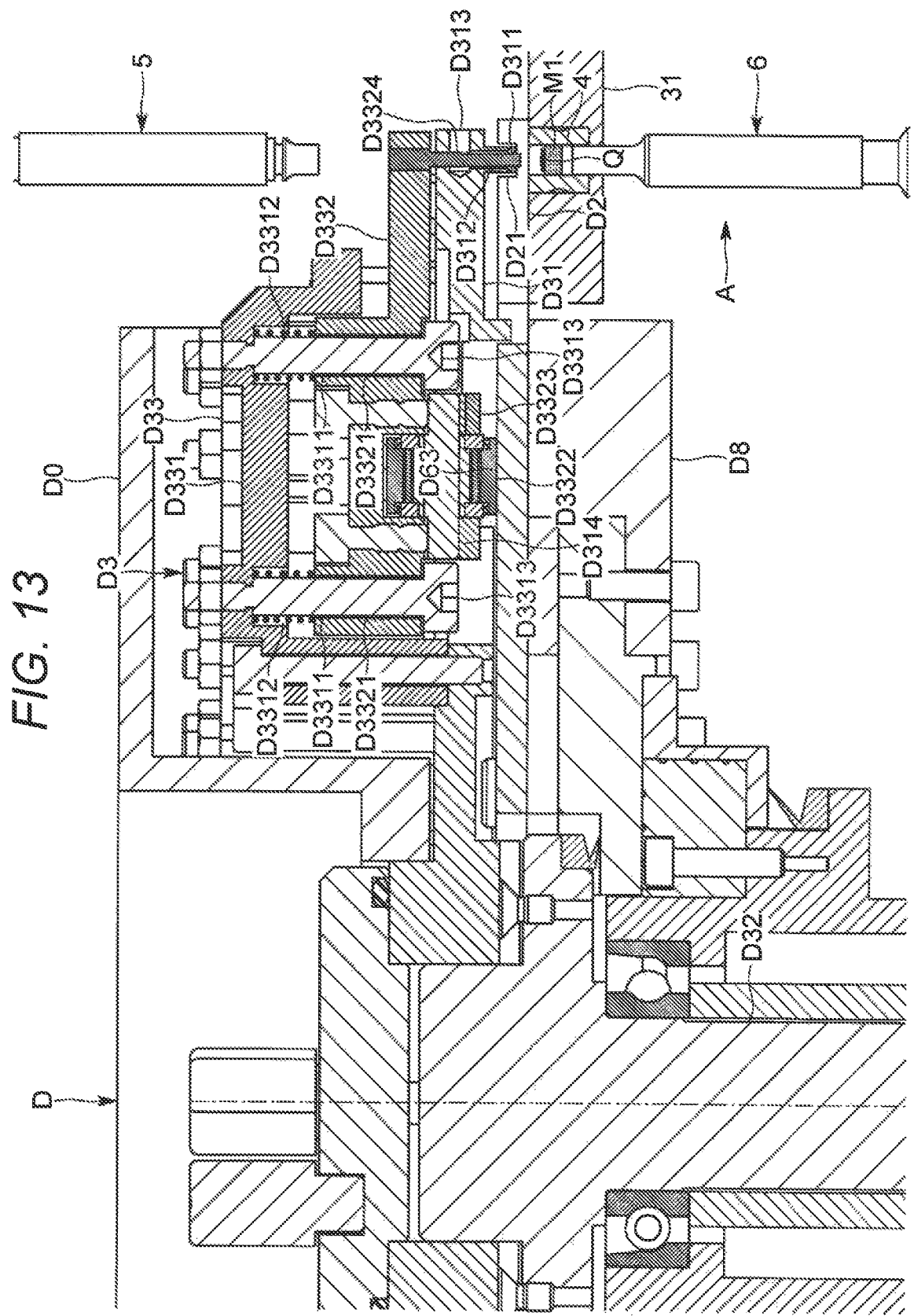
FIG. 13 is a longitudinal sectional view of the supply mechanism in the internal substance supplier and a table in the compression-molding machine according to the exemplary embodiment.

As shown exemplarily in FIGS. 11 to 13, the striking members D33 each include a support frame D331 fixed to the rotator D31, and a swinger D332 supported by the support frame D331 so as to be swingable upward and downward. More specifically, the support frame D331 includes a plurality of vertically extending spindles D3311, whereas the swinger D332 includes a plurality of vertically extending spindle holes D3321 corresponding to the spindles D3311. The spindles D3311 are inserted from above into the spindle holes D3321. There is interposed a compression coil spring D3312 between a downward surface of the support frame D331 fixing upper ends of the spindles D3311 and an upward surface of the swinger D332 facing the downward surface. The compression coil spring D3312 elastically biases to shift the swinger D332 downward to be away from the support frame D331.

The spindles D3311 each have a lower end including a disengagement inhibitor D3313 that radially expands from the spindle D3311 to serve as a head of a bolt. The swinger D332 elastically biased by the compression coil spring D3312 is displaced downward along the spindles D3311 relatively to the support frame D331 and the rotator D31. The swinger D332 has a downward surface that comes into contact with upward surfaces of the disengagement inhibitors D3313 for inhibition of further downward displacement of the swinger D332. Furthermore, disengagement of the spindles D3311 from the spindle holes D3321 is inhibited for prevention of detachment of the swinger D332 from the support frame D331.

The swinger D332 receiving an upward external force is displaced upward relatively to the support frame D331 and the rotator D31 against elastic bias force of the compression coil spring D3312, and the downward surface of the swinger D332 shifts away from the upward surfaces of the disengagement inhibitors D3313. FIGS. 11 and 13 exemplarily show a state where the downward surface of the swinger D332 is in contact with or adjacent to the upward surfaces of the disengagement inhibitors D3313, in other words, the swinger D332 has descended to a lowermost position. In contrast, FIG. 12 exemplarily shows a state where the swinger D332 receives an upward external force having at least a certain magnitude and is shifted upward from the lowermost position.

The swinger D332 has a width direction corresponding to a width direction of the striking member D33 as well as the radial direction of the rotator D31 with the striking member D33 disposed thereon. The swinger D332 has an intermediate portion in the width direction including a cam follower (or a guide roller) D3322 and a slidable base D3323. As shown exemplarily in FIGS. 10, 12, and 13, when the striking member D33 is disposed on the rotator D31, the cam follower D3322 and the slidable base D3323 are exposed to a lower surface of the rotator D31 through a window D314 opened to vertically penetrate the rotator D31. The cam follower D3322 includes an outer ring rotatable about a horizontal axis or a substantially horizontal axis that is parallel to or substantially parallel to the width direction of the swinger D332. The cam follower D3322 rolls on the rail D6 whereas the slidable base D3323 slides on the lifting belt D7. The slidable base D3323 is preferred to be separate from a body of the swinger D332 and be made of a material (possibly a resin material) which is smaller in coefficient of friction than the body to be abrasion-resistant.

The swinger D332 further includes a pin D3324 projecting downward from an outer end in the width direction of the swinger D332. The pin D3324 is inserted from above to one of the pin holes D312 disposed in the outer circumferential edge portion of the rotator D31 when the striking member D33 is disposed on the rotator D31. The pin holes D312 each have a first portion that is positioned below the communicating bore D313 and has an inner diameter slightly larger than an outer diameter of the pin D3324 inserted to the first portion. In contrast, the pin holes D312 each have a second portion that is positioned above the communicating bore D313 and has an inner diameter substantially equal to the outer diameter of the pin D3324 inserted to the second portion. The pin D3324 and the pin hole D312 form a small gap in the second portion above the communicating bore D313, whereas the pin D3324 and the pin hole D312 form a larger gap in the first portion below the communicating bore D313.

When the swinger D332 descends to the lowermost position as shown exemplarily in FIGS. 11 and 13, the pin D3324 has a lower end projecting downward from the lower edge of the pin hole D312 and the lower surface of the projection D311. When the swinger D332 receives an upward external force and is shifted upward from the lowermost position as shown exemplarily in FIG. 12, the lower end of the pin D3324 is retreated above the lower edge of the pin hole D312.

The outer circumferential edge portion of the rotator D31 of the supply disc D3 is partially overlapped in a planar view with the outer circumferential portion of the rotator C1 in the second conveying mechanism C at the scraping position D9. The lower surface of the projection D311 of the rotator D31 comes extremely close from above to the upper surface of the outer circumferential portion of the rotator C1 in the conveying mechanism C and the bottom surface of the recessed groove D21 in the gliding member D2.

At a position ahead of the end edge D212 of the recessed groove D21 in the rotation direction of the supply disc D3, part of the outer circumferential edge portion of the rotator D31 of the supply disc D3 and outer ends of some of the striking members D33 are overlapped in a planar view with the outer circumferential portion of the table 31 and the die bores 4 in the molding machine A. The lower surfaces of the projections D311 and the lower edges of the pin holes D312 in the rotator D31, as well as the lower ends of the pins D3324 of the striking members D33, are positioned above the upper surface of the table 31 in the molding machine A.

The suction unit D4 includes a duct configured to feed negative pressure necessary for suction and retention of the internal substance Q until the internal substance Q colliding with and scraped by the scraping member D1 is pushed to the start edge D211 of the recessed groove D21 in the gliding member D2. The supply disc D3 rotates whereas the duct D4 stays still without rotating. As shown exemplarily in FIGS. 8 and 9, the duct D4 has a cylindrical body expanded to have a partial arc shape in parallel in a planar view with the side surface D11 of the scraping member D1 and the recessed groove D21 at least from the scraping position D9 to a position ahead of the start edge D211 of the recessed groove D21 in the rotation direction of the supply disc D3. The duct B4 has an internal space sucked by a pump (not shown) to have negative pressure. The rotator D31 of the supply disc D3 temporarily sucks to retain the internal substance Q on the lower surface of the outer circumferential edge portion, particularly at the lower edge of the pin hole D312. As shown exemplarily in FIG. 12, the duct D4 is disposed laterally outside the rotator D31, is opened inward, and is located adjacent to the outer circumferential side surface of the rotator D31 such that its opening is positioned just beside the communicating bore D313.

The outlet opening D5 is positioned to face the duct D4 of the suction unit to cause the internal substance Q, which is pushed to the start edge D211 of the recessed groove D21 in the gliding member D2, to be interposed between the outlet opening D5 and the duct D4, and allows compressed air ionized by a static eliminator (e.g., an ionizer) (not shown) to blow upward and/or laterally outward toward the duct D4 to be applied to the internal substance Q for removal of static electricity of the internal substance Q.

The rail D6 is a belt-like body disposed inside the gliding member D2 and the recessed groove D21 and extending to have an arc shape with a partially missing portion in a planar view, and has an axis substantially equal to the axis of the rotator D31 and the shaft D32 of the supply disc D3. The rail D6 is firmly fixed to the base D8 to stay still. The rail D6 has a missing portion D63 located at a position laterally inside the end edge D212 of the recessed groove D21 in the radial direction of the rotator D31. The missing portion D63 is interposed between an ascending portion D61 and a descending portion D62. The ascending portion D61 is a slope having an upper surface gradually ascending from the missing portion D63 at the lowest level, whereas the descending portion D62 is a slope having an upper surface gradually descending toward the missing portion D63 at the lowest level. The rail D6 has a section from an end edge of the ascending portion D61 to a start edge of the descending portion D62, and the section has a flat upper surface. The cam follower D3322 of the swinger D332 in each of the striking members D33 of the supply disc D3 is mounted on the upper surface of the rail D6 and rolls along the rail D6.

The lifting belt D7 is a belt-like body disposed between the gliding member D2 and the rail D6, and specifically, inside the gliding member D2 and the recessed groove D21 and outside the rail D6, extending to have a partial arc shape in a planar view, and has an axis substantially equal to the axis of the rotator D31 and the shaft D32 of the supply disc D3. The lifting belt D7 is firmly fixed to the base D8 to stay still. The lifting belt D7 has a start edge D71 located at a position laterally outside, in the radial direction of the rotator D31, the flat section displaced in a direction opposite to the rotation direction of the supply disc D3 from the start edge of the descending portion D62 in the rail D6. The lifting belt D7 has an end edge D72 located at a position laterally outside an end edge of the descending portion D62 in the rail D6 in the radial direction of the rotator D31. The lifting belt D7 has a flat upper surface. The upper surface of the lifting belt D7 is positioned slightly above the upper surface of the flat section of the rail D6. The upper surface of the descending portion D62 in the rail D6 constitutes a gradually descending slope, and is cut off at the end edge D72 of the lifting belt D7. The slidable base D3323 of the swinger D332 in each of the striking members D33 of the supply disc D3 is mounted on the upper surface of the lifting belt D7 and slides along the lifting belt D7.

The supply disc D3 assembled to the upper portion of the shaft D32 covers, from above, the gliding member D2, the outlet opening D5, the rail D6, the lifting belt D7, and the base D8. As shown exemplarily in FIGS. 2, 6, 12, and 13, most of the supply disc D3 is actually covered with a cover DO. Air is sent into the cover DO for inhibition of a driving defect and the like due to dust adhering to the supply mechanism D.

Operation of the supply mechanism D to supply each of the die bores 4 in the table 31 of the molding machine A with the internal substance Q will be described below. The internal substance Q sucked and captured in the suction bore C11 in the rotator C1 of the second conveying mechanism C is transferred along with rotation of the rotator C1, passes vertically below the duct D4 of the suction unit, and then reaches the scraping position D9. At the scraping position D9, the internal substance Q collides with the side surface of the scraping member D1 and is scraped from the suction bore C11 in the rotator C1.

The single internal substance Q scraped from the suction bore C11 stays at the scraping position D9 for a short period of time. When one set of the projection D311 and the pin hole D312 of the rotating supply disc D3 comes close to the internal substance Q, the communicating bore D313 communicating with the pin hole D312 is sucked by the duct D4 and the pin hole D312 is fed with negative pressure and sucks the internal substance Q upward from below.

As shown exemplarily in FIG. 12, the internal substance Q on the rotator C1 of the conveying mechanism C is thus sucked to be engaged with the lower edge of the pin hole D312 in the rotator D31 of the supply disc D3, and the end surface D3111 of the projection D311 facing the pin hole D312 comes into contact with the internal substance Q to push to transfer the internal substance Q. The internal substance Q staying at the scraping position D9 can be reliably sucked to the pin hole D312, so as to be dropped appropriately at a desired position (e.g., the center) in the die bore 4 in the table 31 of the molding machine A. The lower end of the pin D3324 inserted to the pin hole D312 is retreated above the lower edge of the pin hole D312 in this case. This is because the cam follower D3322 of the swinger D332 in the striking member D33 including the pin D3324 steps onto the flat section of the rail D6 and the swinger D332 is shifted upward from the lowermost position. The single set of the projection D311 and the pin hole D312 engages and captures the single internal substance Q. Two or more internal substances Q will not simultaneously stay at the scraping position D9.

The lower edge of the pin hole D312 is counter-bored. The lower edge of the pin hole D312 is counter-bored to correspond to an upper surface of the internal substance Q including a center portion (e.g., particularly the film Q2) bulging upward from a peripheral edge as shown exemplarily in FIGS. 4A and 4B, for prevention of a gap between the pin hole D312 and the internal substance Q sucked thereto or a tilted posture of the sucked internal substance Q instead of a substantially horizontal posture.

Figure 9:
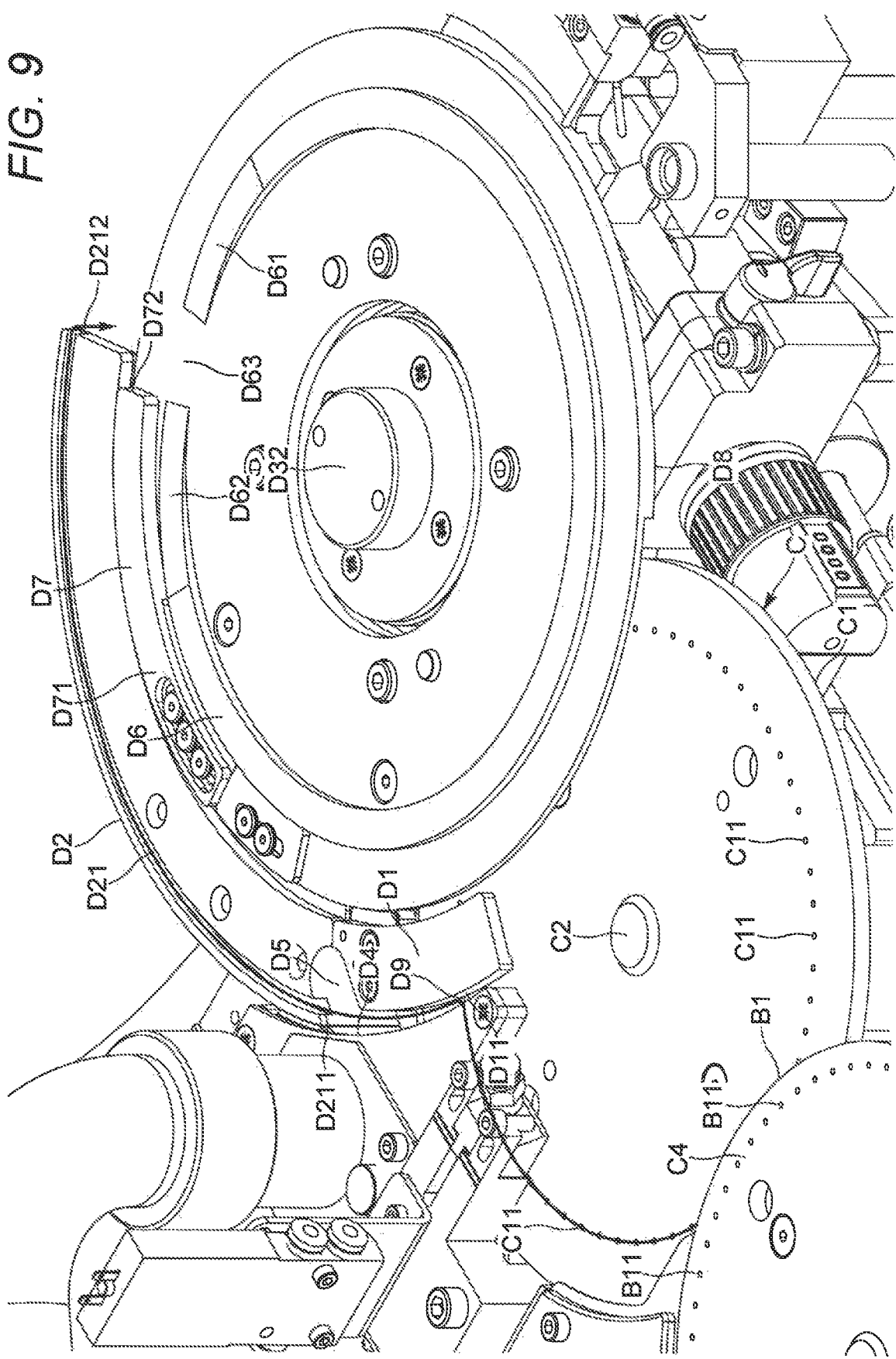
FIG. 9 is an enlarged perspective view of a scraping member, a gliding member, a suction unit, an outlet opening, a lifting belt, and a rail included in the supply mechanism of the internal substance supplier according to the exemplary embodiment.

Along with rotation of the supply disc D3, the internal substance Q captured by the set of the projection D311 and the pin hole D312 is transferred along a horizontal rotation locus of the projection D311 and the pin hole D312. The internal substance Q is pushed to the start edge D211 of the recessed groove D21 in the gliding member D2 from the scraping position D9, then glides or slides in the recessed groove D21 to reach the end edge D212 of the recessed groove D21, and is dropped into one of the die bores 4 in the table 31 of the molding machine A. FIG. 9 exemplarily indicates a shift direction and the locus of the internal substance Q. In a course of pushing the internal substance Q to the start edge D211 of the recessed groove D21 from the scraping position D9, static-eliminating air blowing out of the outlet opening D5 is applied to the internal substance Q.

Negative pressure fed from the duct D4 to the pin hole D312 in the set of the projection D311 and the pin hole D312 capturing the internal substance Q stops after the internal substance Q is pushed into the recessed groove D21. The internal substance Q is subsequently pushed by the end surface D3111 of the projection D311 to be transferred along the recessed groove D21 to the end edge D212.

As already described, the cam follower D3322 of the swinger D332 in the striking member D33 paired with the set of the projection D311 and the pin hole D312 capturing the internal substance Q rolls on the flat section of the rail D6. While the striking member D33 horizontally turns from the start edge D211 toward the end edge D212 of the recessed groove D21, the slidable base D3323 of the swinger D332 in the striking member D33 reaches the start edge D71 of the lifting belt D7 and a lower surface of the slidable base D3323 then comes into sliding contact with or comes extremely close to the upper surface of the lifting belt D7.

When the set of the projection D311 and the pin hole D312 capturing the internal substance Q approaches the end edge D212 of the recessed groove D21, the cam follower D3322 of the swinger D332 in the striking member D33 paired with the set of the projection D311 and the pin hole D312 reaches the descending portion D62 of the rail D6 and rolls downward along the descending portion D62. The swinger D332 no longer supported by the cam follower D3322 tends to descend, so that the slidable base D3323 of the swinger D332 comes into contact with the upper surface of the lifting belt D7 to keep supporting the swinger D332 while sliding on the upper surface of the lifting belt D7.

When the supply disc D3 further rotates and the striking member D33 further turns to cause the slidable base D3323 of the swinger D332 to reach the end edge D72 of the lifting belt D7, the slidable base D3323 drops from the upper surface of the lifting belt D7. The swinger D332 no longer supported by the slidable base D3323 either starts descending toward the lowermost position. The pin D3324 inserted to the pin hole D312 accordingly tends to project downward from the pin hole D312.

Immediately thereafter, the set of the projection D311 and the pin hole D312 capturing the internal substance Q reaches the end edge D212 of the recessed groove D21. The internal substance Q is thus pushed out of the end edge of the recessed groove D21 and drops from the bottom surface of the recessed groove D21. As shown exemplarily in FIG. 13, the lower end of the pin D3324 of the striking member D33 paired with the set of the projection D311 and the pin hole D312 having captured the internal substance Q simultaneously projects downward from the lower edge of the pin hole D312 to hit the internal substance Q and reliably strike the internal substance Q out of the rotator D31 of the supply disc D3. The die bore 4 filled with the powdery material M1 is disposed vertically below the internal substance Q at this timing, and the internal substance Q drops into the die bore 4. The internal substance Q can thus be supplied appropriately into the die bore 4 in the table 31 of the molding machine A.

The swinger D332 having struck the internal substance Q shifts upward from the lowermost position again when the supply disc D3 further rotates and the cam follower D3322 steps onto the ascending portion D61 of the rail D6. The pin D3324 is retreated above the lower edge of the pin hole D312.

The turret 3 in the molding machine A, the rotators B1 and C1 in the conveying mechanisms B and C, and the supply disc D3 in the conveying mechanism D need to rotate in synchronization. In order to synchronize rotation among the turret 3, the rotators B1 and C1, and the supply disc D3, each of the turret 3, the rotators B1 and C1, and the supply disc D3 may be driven to rotate by a motor configured as a servo motor or a stepping motor, and an angular position sensor such as a rotary encoder may be adopted to detect a rotation angle and rotational speed of each of the turret 3, the rotators B1 and C1, and the supply disc D3, to achieve feedback control of a rotational speed of each of the motors for synchronized rotation. The turret 3, the rotators B1 and C1, and the supply disc D3 may alternatively be mechanically connected to interlock via a gear transmission mechanism, a winding transmission mechanism, or the like.

The exemplary embodiment provides an internal substance supplier B, C, or D configured to supply an internal substance Q to be buried in a molded product P into a die bore 4 in a table 31 of a compression-molding machine A configured to fill the die bore 4 with a powdery material M1 or M2 and compress the powdery material M1 or M2 by upper and lower punches 5 and 6 to obtain the molded product P, the internal substance supplier B, C, or D including: a conveying mechanism B or C including a conveying member (i.e., rotator) B1 or C1 configured to capture and convey the internal substance Q; and a supply mechanism D including a scraping member D1 disposed to cross a conveyance route of the internal substance Q by the conveying member C1 in the conveying mechanism C and configured to collide with the internal substance Q conveyed by the conveying member C1, a gliding member D2 including a recessed groove D21 configured to guide the internal substance Q colliding with the scraping member D1 and scraped from the conveying member C1, to be adjacent to a position vertically above the die bore 4 in the table 31 of the compression-molding machine A, and a push transfer member (i.e., rotator) D31 including a projection D311 configured to come into contact with the internal substance Q colliding with the scraping member D1, push the internal substance Q to a start edge D211 of the recessed groove D21 in the gliding member D2, and move along the recessed groove D21 to transfer the internal substance Q to an end edge D212 of the recessed groove D21. The exemplary embodiment enables the internal substance Q, which is to be buried in the molded product P, to be appropriately supplied to the die bore 4 in the table 31 in the compression-molding machine A.

The internal substance supplier B, C, or D according to the exemplary embodiment includes the conveying members B1 and C1 in the conveying mechanisms B and C, and the push transfer member D31 in the supply mechanism D, which serve as rotatable rotators. These rotators B1, C1, and D31 include three rotators in total. The tiny and thin internal substance Q having been picked up can be appropriately supplied to the die bore 4 in the table 31 of the molding machine A by such a minimally necessary configuration, and specifically, only the three mechanisms including the two suction conveying mechanisms B and C and the single gliding supply mechanism D. The rotators B1, C1, and D31 in the internal substance supplier B, C, or D do not include four or more rotators.

The supply mechanism D further includes a striking member D33 supported by the push transfer member D31 and configured to move along with the projection D311 and hit from above the internal substance Q reaching the end edge D212 of the recessed groove D21 in the gliding member D2 to drop the internal substance into the die bore 4 in the table 31 of the compression-molding machine A. Even when the internal substance Q (e.g., particularly the cellulose film Q2 or Q3) adheres to the push transfer member D31 due to static electricity or the like, the internal substance Q can be reliably struck from the push transfer member D31 at the end edge D212 of the recessed groove D21 and can be dropped into the die bore 4 in the table 31.

The supply mechanism D further includes a suction unit D4 configured to suck to retain the internal substance Q until the internal substance Q colliding with the scraping member D1 is pushed to the start edge D211 of the recessed groove D21 in the gliding member D2 by the projection D311 of the push transfer member D31. This configuration reliably enables the internal substance Q to be pushed to the start edge D211 of the recessed groove D21 and glide or slide in the recessed groove D21.

The supply mechanism D further has an outlet opening D5 positioned to confront the internal substance Q pushed to the start edge D211 of the recessed groove D21 in the gliding member D2 and allowing air for static elimination of the internal substance Q to blow out. This configuration achieves removal of static electricity at the internal substance Q to be supplied to the molding machine A.

The exemplary embodiment provides a method of producing a molded product P containing an internal substance Q and obtained by compression molding in a die bore 4 in a table 31 of a turret 3, the method including: conveying the internal substance Q by a carrier tape T; ejecting the internal substance Q conveyed by the carrier tape T, sucking the internal substance Q to a lower surface of a first rotator B1, and conveying the internal substance Q to a first position C4 by the first rotator B1; delivering the internal substance Q at the first position C4 from the first rotator B1 to an upper surface of a second rotator C1, and sucking and conveying the internal substance Q to a second position D9 by the second rotator C1; and push to transfer the internal substance Q on the upper surface of the second rotator C1 at the second position D9 in a direction different from a rotation direction of the second rotator C1 by a push transfer member D31 disposed at a third rotator, to convey the internal substance Q to a position of the die bore 4 in the turret 3. (i.e., a direction crossing or being perpendicular to a horizontal rotation locus of the internal substance Q captured and conveyed by the second rotator C1) According to this method, such a minimally necessary configuration enables execution of a series of processing including receiving the internal substance Q to be buried in the molded product P, conveying the internal substance Q, and supplying the internal substance Q into the die bore 4 of the molding machine A. According to this method, the rotators B1, C1, and D31 do not include four or more rotators in total.

The push transfer member D31 transfers the internal substance Q from the upper surface of the second rotator C1 to an upper surface of a gliding member D2 disposed below the push transfer member D31, and causes the internal substance to glide on the gliding member D2.

The internal substance Q on the upper surface of the second rotator C1 is scraped at the second position D9 by a scraping member D1 disposed above the second rotator C1.

The exemplary embodiment provides an internal substance supplier B, C, or D configured to supply an internal substance Q to be buried in a molded product P, to a die bore 4 in a table 31 of a molding machine A configured to fill the die bore 4 with a powdery material M1 or M2 and compress the powdery material M1 or M2 to obtain the molded product P, the internal substance supplier including: a first rotator B1 configured to eject the internal substance Q conveyed by a carrier tape T, suck the internal substance Q to a lower surface of the first rotator B1, and convey the internal substance Q to a first position C4; a second rotator C1 configured to receive the internal substance Q from the first rotator at the first position C4, suck the internal substance Q to an upper surface of the second rotator C1, and convey the internal substance Q to a second position D9; and a push transfer member D31 disposed at a third rotator and configured to push to transfer the internal substance Q on the upper surface of the second rotator at the second position D9 in a direction different from a rotation direction of the second rotator C1. According to the exemplary embodiment, such a minimally necessary configuration enables execution of a series of processing including receiving the internal substance Q to be buried in the molded product P, conveying the internal substance Q, and supplying the internal substance Q into the die bore 4 of the molding machine A.

The internal substance supplier B, C, or D further includes a gliding member D2 disposed below the push transfer member D31 and serving as a gliding surface for the internal substance Q pushed to be transferred from the upper surface of the second rotator C1.

The internal substance supplier B, C, or D further includes a scraping member D1 disposed above the second rotator C1 and configured to scrape the internal substance Q on the upper surface of the second rotator C1 at the second position D9.

The exemplary embodiment provides an internal substance supplier B, C, or D configured to supply an internal substance Q to be buried in a molded product P into a die bore 4 in a table 31 of a molding machine A configured to fill the die bore with a powdery material M1 or M2 and compress the powdery material M1 or M2 to obtain the molded product P, the internal substance supplier including: a conveying mechanism C including a conveying member C1 configured to capture and convey the internal substance Q; and a supply mechanism D including a scraping member D1 disposed to cross a conveyance route of the internal substance Q conveyed by the conveying member C1 in the conveying mechanism C and configured to collide with the internal substance Q conveyed by the conveying member C1, and a push transfer member D31 including a projection D311 configured to come into contact with the internal substance Q colliding with the scraping member D1 to transfer the internal substance Q. The exemplary embodiment achieves appropriate supply of the internal substance Q conveyed by the conveying mechanism C to the die bore 4 in the table 31 of the molding machine A by the supply mechanism D.

The conveying member C1 and the push transfer member D31 rotate in synchronization with each other.

The exemplary invention is not limited to the exemplary embodiment detailed above. For example, the exemplary embodiment refers to the molded product P produced as a pharmaceutical product and the internal substance Q including the chip Q1 used for communication between inside and outside a body of a person having taken the pharmaceutical product. The molded product P is not limited to the pharmaceutical product, and the internal substance Q does not necessarily include the chip Q1. The molded product P may be a food product, or small medical equipment, diagnostic equipment, measuring instrument, or the like, which can be taken by a person or can enter a body of a person. Examples of the internal substance Q may include a micromachine, a nanomachine, and a tiny robot circulating in a body of a person.

Moreover, specific configurations of respective parts can be modified in various manners within the range not departing from the purpose of the exemplary invention.

The descriptions of the various exemplary embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. An internal substance supplier configured to supply an internal substance to be buried in a molded product into a die bore in a table of a compression molding machine configured to fill the die bore with a powdery material and compress the powdery material by upper and lower punches to obtain the molded product, the internal substance supplier comprising:
   a conveying mechanism including a conveying member configured to capture and convey the internal substance; and
   a supply mechanism including a scraping member disposed to cross a conveyance route of the internal substance by the conveying member in the conveying mechanism and configured to collide with the internal substance conveyed by the conveying member, a gliding member including a recessed groove configured to guide the internal substance colliding with the scraping member and scraped from the conveying member, to be adjacent to a position vertically above the die bore in the table of the compression molding machine, and a push transfer member including a projection configured to come into contact with the internal substance colliding with the scraping member, push the internal substance to a start edge of the recessed groove in the gliding member, and move along the recessed groove to transfer the internal substance to an end edge of the recessed groove,
   wherein the scraping member comprises a side surface that is an upright partial cylindrical surface having a partial arc shape in a planar view along a rotary axis of a supply disc or in a vertical direction and having an axis and a diameter substantially equal to an inner circumferential side surface of the recessed groove.

2. The internal substance supplier according to claim 1, wherein the supply mechanism further includes a striking member supported by the push transfer member and configured to move along with the projection and hit from above the internal substance reaching the end edge of the recessed groove in the gliding member to drop the internal substance into the die bore in the table of the compression molding machine.

3. The internal substance supplier according to claim 1, wherein the supply mechanism further includes a suction unit configured to suck to retain the internal substance until the internal substance colliding with the scraping member is pushed to the start edge of the recessed groove in the gliding member by the projection of the push transfer member.

4. The internal substance supplier according to claim 3, wherein the supply mechanism further has an outlet opening positioned to confront the internal substance pushed to the start edge of the recessed groove in the gliding member and allowing air for static elimination of the internal substance to blow out.

5. The internal substance supplier according to claim 1, wherein the internal substance includes a chip used for communication between inside and outside a body of a person including the molded product in the body.

6. The internal substance supplier according to claim 1, wherein the molded product comprises a pharmaceutical product.

7. The internal substance supplier according to claim 1, wherein the conveying member in the conveying mechanism and the push transfer member in the supply mechanism comprise rotatable rotators, and the internal substance supplier totally includes three rotators configured similarly to the rotatable rotators.

8. The internal substance supplier according to claim 7, wherein the supply mechanism further includes a striking member supported by the push transfer member and configured to move along with the projection and hit from above the internal substance reaching the end edge of the recessed groove in the gliding member to drop the internal substance into the die bore in the table of the compression molding machine.

9. The internal substance supplier according to claim 2, wherein the supply mechanism further includes a suction unit configured to suck to retain the internal substance until the internal substance colliding with the scraping member is pushed to the start edge of the recessed groove in the gliding member by the projection of the push transfer member.

10. The internal substance supplier according to claim 9, wherein the supply mechanism further has an outlet opening positioned to confront the internal substance pushed to the start edge of the recessed groove in the gliding member and allowing air for static elimination of the internal substance to blow out.

11. An internal substance supplier configured to supply an internal substance to be buried in a molded product, to a die bore in a table of a compression molding machine configured to fill the die bore with a powdery material and compress the powdery material to obtain the molded product, the internal substance supplier comprising:
    a first rotator configured to eject the internal substance conveyed by a carrier tape, suck the internal substance to a lower surface of the first rotator, and convey the internal substance to a first position;
    a second rotator configured to receive the internal substance from the first rotator at the first position, suck the internal substance to an upper surface of the second rotator, and convey the internal substance to a second position;
    a push transfer member disposed at a third rotator and configured to push to transfer the internal substance on the upper surface of the second rotator at the second position in a direction different from a rotation direction of the second rotator; and
    a scraping member disposed above the second rotator and configured to scrape the internal substance on the upper surface of the second rotator at the second position,
    wherein the scraping member comprising a side surface that is an upright partial cylindrical surface having a partial arc shape in a planar view along a rotary axis of the third rotator or in a vertical direction and having an axis and a diameter substantially equal to an inner circumferential side surface of a recessed groove of gliding member.

12. The internal substance supplier according to claim 11, further comprising a gliding member disposed below the push transfer member and comprising the gliding surface for the internal substance pushed to be transferred from the upper surface of the second rotator.

13. The internal substance supplier according to claim 11, wherein the internal substance includes an IC chip, and the molded product comprises a pharmaceutical product.

14. An internal substance supplier configured to supply an internal substance to be buried in a molded product into a die bore in a table of a compression molding machine configured to fill the die bore with a powdery material and compress the powdery material to obtain the molded product, the internal substance supplier comprising:
- a conveying mechanism including a conveying member configured to capture and convey the internal substance; and
- a supply mechanism including a scraping member disposed to cross a conveyance route of the internal substance conveyed by the conveying member in the conveying mechanism and configured to collide with the internal substance conveyed by the conveying member, and a push transfer member including a projection configured to come into contact with the internal substance colliding with the scraping member to transfer the internal substance,
- wherein the scraping member comprising a side surface that is an upright partial cylindrical surface having a partial arc shape in a planar view along a rotary axis of a supply disc or in a vertical direction and having an axis and a diameter substantially equal to an inner circumferential side surface of a recessed groove of a gliding member.

15. The internal substance supplier according to claim 14, wherein the conveying member and the push transfer member rotate in synchronization with each other.

* * * * *